United States Patent
Stinson, III

(10) Patent No.: US 8,957,856 B2
(45) Date of Patent: Feb. 17, 2015

(54) SYSTEMS, METHODS, AND APPARATUSES FOR SPATIAL INPUT ASSOCIATED WITH A DISPLAY

(75) Inventor: Willis D. Stinson, III, Sherborn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 625 days.

(21) Appl. No.: 12/909,807

(22) Filed: Oct. 21, 2010

(65) Prior Publication Data

US 2012/0098744 A1     Apr. 26, 2012

(51) Int. Cl.
  *G09G 5/08* (2006.01)
  *G06F 3/03* (2006.01)
  *G06F 3/0346* (2013.01)
  *G06F 3/0354* (2013.01)

(52) U.S. Cl.
  CPC ............ *G06F 3/0304* (2013.01); *G06F 3/0325* (2013.01); *G06F 3/0346* (2013.01); *G06F 3/03542* (2013.01)
  USPC .............................. 345/158; 345/159; 348/159

(58) Field of Classification Search
  None
  See application file for complete search history.

(56) References Cited

U.S. PATENT DOCUMENTS

| | | | |
|---|---|---|---|
| 5,107,443 A | 4/1992 | Smith et al. |
| 5,239,373 A | 8/1993 | Tang et al. |
| 5,381,158 A | 1/1995 | Takahara et al. |
| 5,442,788 A | 8/1995 | Bier |
| 5,534,917 A | 7/1996 | MacDougall |
| 5,561,811 A | 10/1996 | Bier |
| 5,594,469 A | 1/1997 | Freeman et al. |
| 5,677,700 A | 10/1997 | Schwalba et al. |
| 5,732,227 A | 3/1998 | Kuzunuki et al. |
| 5,767,842 A | 6/1998 | Korth |
| 5,917,490 A | 6/1999 | Kuzunuki et al. |
| 6,008,800 A | 12/1999 | Pryor |
| 6,128,003 A | 10/2000 | Smith et al. |
| 6,191,773 B1 | 2/2001 | Maruno et al. |
| 6,266,057 B1 | 7/2001 | Kuzunuki et al. |
| 6,417,841 B1 | 7/2002 | Doi et al. |
| 6,498,628 B2 | 12/2002 | Iwamura |
| 6,498,970 B2 | 12/2002 | Colmenarez et al. |
| 6,501,515 B1 | 12/2002 | Iwamura |
| 6,594,616 B2 | 7/2003 | Zhang et al. |

(Continued)

OTHER PUBLICATIONS

Gesturetek, Gesturetek Tradeshow Demo, 1 page, http://www.youtube.com/watch?v=BrvtvfM-WCw, as accessed on Apr. 22, 2010.

(Continued)

*Primary Examiner* — Joe H Cheng
*Assistant Examiner* — Yaron Cohen

(57) ABSTRACT

An exemplary system includes a handheld user input device configured to emit a pointing signal and a selection signal from within a physical user space and directed at a display screen. The exemplary system further includes a spatial input subsystem configured to detect the pointing signal, determine a physical position within the physical user space based on the detected pointing signal, map the determined physical position within the physical user space to a cursor position on the display screen, output data representative of the cursor position for use by a display subsystem associated with the display screen, detect the selection signal, and output, in response to the selection signal, data representative of a selection command for use by the display subsystem. Corresponding systems, methods, and apparatuses are also disclosed.

27 Claims, 15 Drawing Sheets

(56) References Cited

U.S. PATENT DOCUMENTS

| | | |
|---|---|---|
| 6,624,833 B1 | 9/2003 | Kumar et al. |
| 6,720,949 B1 | 4/2004 | Pryor et al. |
| 6,788,809 B1 | 9/2004 | Grzeszczuk et al. |
| 6,952,199 B2 | 10/2005 | Doi et al. |
| 6,996,460 B1 | 2/2006 | Krahnstoever et al. |
| 7,007,236 B2 | 2/2006 | Dempski et al. |
| 7,058,204 B2 | 6/2006 | Hildreth et al. |
| 7,134,080 B2 | 11/2006 | Kjeldsen et al. |
| 7,227,526 B2 | 6/2007 | Hildreth et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,430,312 B2 | 9/2008 | Gu |
| 7,874,918 B2 * | 1/2011 | Osnato et al. .............. 463/36 |
| 2002/0036617 A1 | 3/2002 | Pryor |
| 2002/0186200 A1 | 12/2002 | Green |
| 2003/0032478 A1 | 2/2003 | Takahama et al. |
| 2004/0063480 A1 | 4/2004 | Wang |
| 2004/0063481 A1 | 4/2004 | Wang |
| 2004/0155902 A1 | 8/2004 | Dempski et al. |
| 2004/0193413 A1 | 9/2004 | Wilson et al. |
| 2005/0104850 A1 | 5/2005 | Hu et al. |
| 2005/0259035 A1 | 11/2005 | Iwaki et al. |
| 2006/0010400 A1 | 1/2006 | Dehlin et al. |
| 2006/0033713 A1 * | 2/2006 | Pryor .................... 345/158 |
| 2006/0044265 A1 | 3/2006 | Min |
| 2011/0248960 A1 * | 10/2011 | Gruhlke ................. 345/175 |
| 2011/0260965 A1 * | 10/2011 | Kim et al. .............. 345/156 |
| 2012/0050535 A1 * | 3/2012 | Densham et al. .......... 348/159 |

OTHER PUBLICATIONS

Eon, TouchLight, 1 page, http://www.youtube.com/watch?v=DTMLdjVoLQw, as.accessed on Apr. 22, 2010.

Atlas Gloves, Atlas Gloves Demo, 1 page, http://atlasgloves.org/demo, as accessed on Apr. 22, 2010.

Oblong Industries, G-Speak, 1 page, http://www.youtube.com/watch?v=dyMVZqJk8s4, as accessed on Apr. 22, 2010.

Jeff Han, Multi-Touch Sensing, 1 page, http://www.youtube.com/watch?v=zwGAKUForhM, as accessed on Apr. 22, 2010.

Toshiba, Gesture Interface Demo, 1 page, http://www.youtube.com/watch?v=RL9MpXhWCrQ, as accessed on Apr. 22, 2010.

Engadget, Winscape Virtual Window, 1 page, http://www.engadget.com/2010/04/15/winscape-virtual-window-features-wiimote-headtracking-absolutel/, as accessed on Apr. 30, 2010.

Engadget, Headtracking, 1 page, http://www.engadget.com/2007/12/21/diy-head-tracker-takes-wiimote-hacking-to-dizzying-new-heights/, as accessed on Aug. 4, 2010.

Rationalcraft, Winscape, 3 pages, http://rationalcraft.com/Winscape.html, as accessed on Aug. 6, 2010.

Microsoft, WorldCursor, 1 page, http://research.microsoft.com/en-us/um/people/awilson/publications/WilsonInteract2003/WilsonInteract2003.html,as accessed on Oct. 21, 2010.

Wilson, Andrew and Pham, Hubert, "Pointing in Intelligent Environments with the WorldCursor", 8 pages, http://research.microsoft.com/en-us/um/people/awilson/publications/WilsonInteract2003/Interact%202003%20WorldCursor.pdf, as accessed on Oct. 21, 2010.

* cited by examiner

SYSTEMS, METHODS, AND APPARATUSES FOR SPATIAL INPUT ASSOCIATED WITH A DISPLAY

BACKGROUND INFORMATION

As computer system technologies have advanced, so too have user interface technologies that allow users to interact with computer systems. For example, a user of a computer system may utilize an input device such as a mouse, keyboard, track pad, track ball, or touch screen to provide input to control a computer system implemented by a personal computer, mobile phone, or other computing device.

However, certain user input devices may not be suitable for all computer systems. To illustrate, increasingly large display screens capable of displaying output (e.g., graphical user interfaces, media content, etc.) provided by computer systems have become available to consumers. For instance, certain commercially-available flat-panel televisions have display screens measuring several feet in length. Unfortunately, not all user input devices are suitable or practical for such large display screens. For example, a large display screen having a touch screen interface would require a viewer to position herself in close proximity of the display screen in order to be within reach to touch the touch screen interface. Moreover, if the display screen is large enough, the viewer may be required to move her body relative to the display screen in order to be able to physically reach and touch certain positions on the touch screen interface. For at least these reasons, new and/or improved user input technologies are desired, particularly user input technologies that are well-suited for distant interaction with large display screens such as flat-panel televisions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems, methods, and apparatuses for spatial input associated with a display are disclosed herein. As described in more detail below, the exemplary systems, methods, and apparatuses disclosed herein may enable a user to utilize a handheld user input device to provide spatial input associated with an electronic display. A spatial input subsystem may detect and process the spatial input provided by the handheld user input device, and output data representative of the spatial input to a display subsystem, which may perform one or more operations associated with the electronic display based on the spatial input. In this manner, the user may utilize the handheld user input device to provide spatial input to control one or more operations associated with the electronic display. The exemplary systems, methods, and apparatuses disclosed herein may enable the user to provide spatial input that is well-suited for controlling a display on a large display screen.

As used herein, the term "spatial input" may refer to any user input that is provided by a handheld user input device utilized by a user within a physical user space associated with a display screen and that is detectable by a spatial input subsystem configured to detect the spatial input. Examples of spatial input provided by a handheld user input device and detected by a spatial input subsystem are described herein.

Exemplary systems, methods, and apparatuses for spatial input associated with a display will now be described in reference to the drawings.

Figure 1:
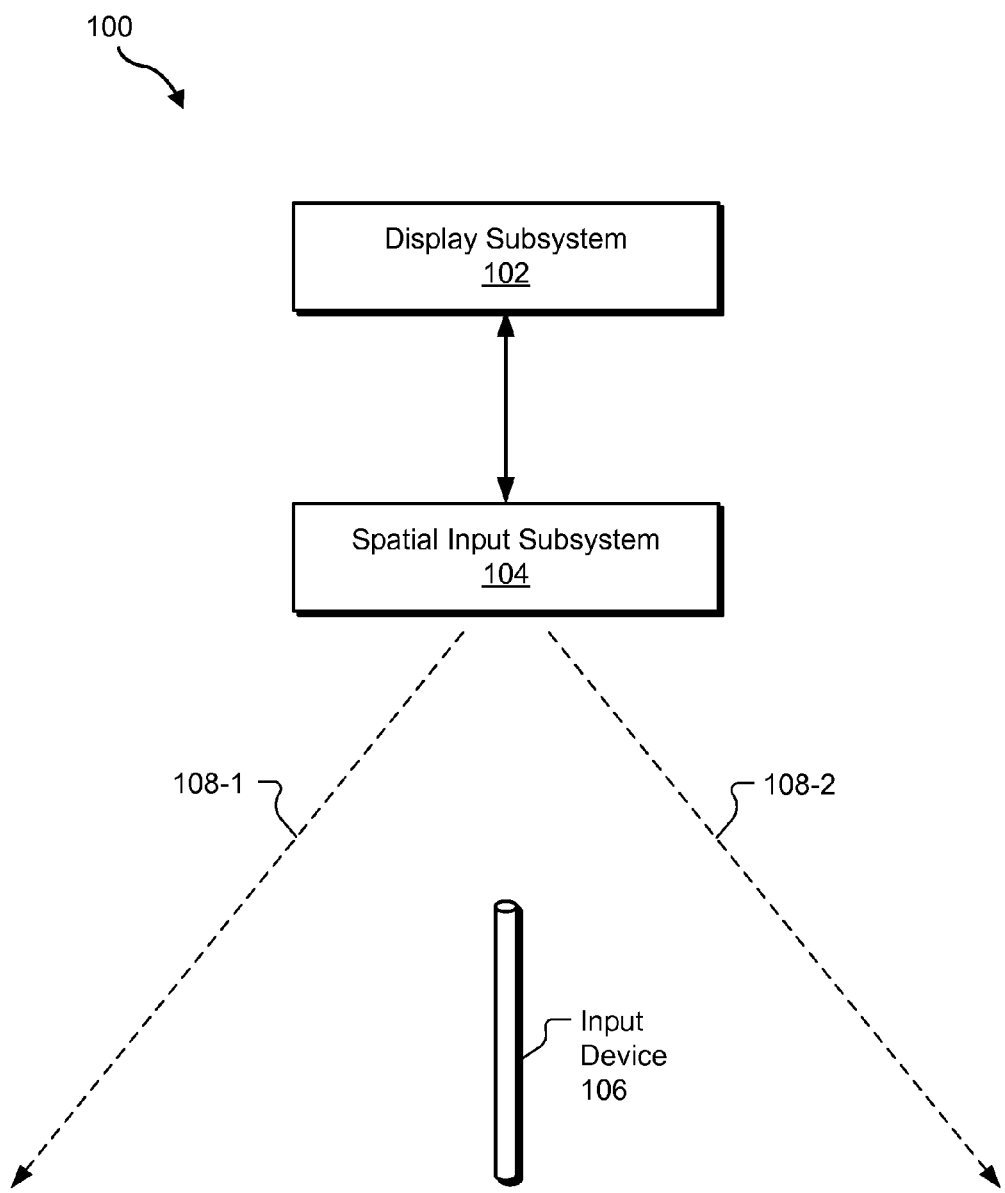
FIG. 1 illustrates an exemplary display and input system according to principles described herein.

FIG. 1 illustrates an exemplary display and input system 100 (e.g., or simply "system 100"). System 100 may include, but is not limited to, a display subsystem 102 and a spatial input subsystem 104, which may be communicatively coupled to one another using any suitable technologies. Display subsystem 102 may be configured to provide display content for display on one or more display screens for viewing by one or more users. Content displayed on a display screen may be viewed by a user located in a physical user space, which may include any three-dimensional space from which the user may view the display screen. In certain examples, the physical user space may be located generally in front of the display screen. In certain examples, at least a portion of the physical user space may be distant of the display screen (e.g., beyond a user's physical reach of the display screen).

System 100 may also include a handheld user input device 106 (or simply "input device 106") configured to provide spatial input from within a physical user space for detection by spatial input subsystem 104. A user located within the physical user space may hold and utilize input device 106 to provide spatial input for detection by spatial input subsystem 104. In certain examples, the spatial input provided by input device 106 may include one or more discrete signals emitted by input device 106 from within the physical user space for detection and processing by spatial input subsystem 104. Examples of such discrete signals are described herein.

Spatial input subsystem 104 may be configured to detect and process the spatial input provided by input device 106 from within the physical user space. In certain examples, the physical user space from which spatial input is provided may be defined by or may otherwise coincide with a sensing range of spatial input subsystem 104. For example, spatial input subsystem 104 may include one or more sensors configured to sense spatial input within a range of the sensor(s). FIG. 1 illustrates exemplary boundaries 108 (e.g., boundaries 108-1 and 108-2) of a physical space within the boundaries 108 that may be referred to as a sensing range of spatial input subsystem 104.

Spatial input subsystem 104 may be configured to process detected spatial input and output data representative of the spatial input to display subsystem 102, which may be configured to perform one or more operations associated with a display based on the data received from spatial input subsystem 104. Accordingly, the user may utilize input device 106 to provide spatial input to control one or more operations associated with a display provided by display subsystem 102.

Display subsystem 102, input device 106, and spatial input subsystem 104 each will now be described in additional detail.

Figure 2:
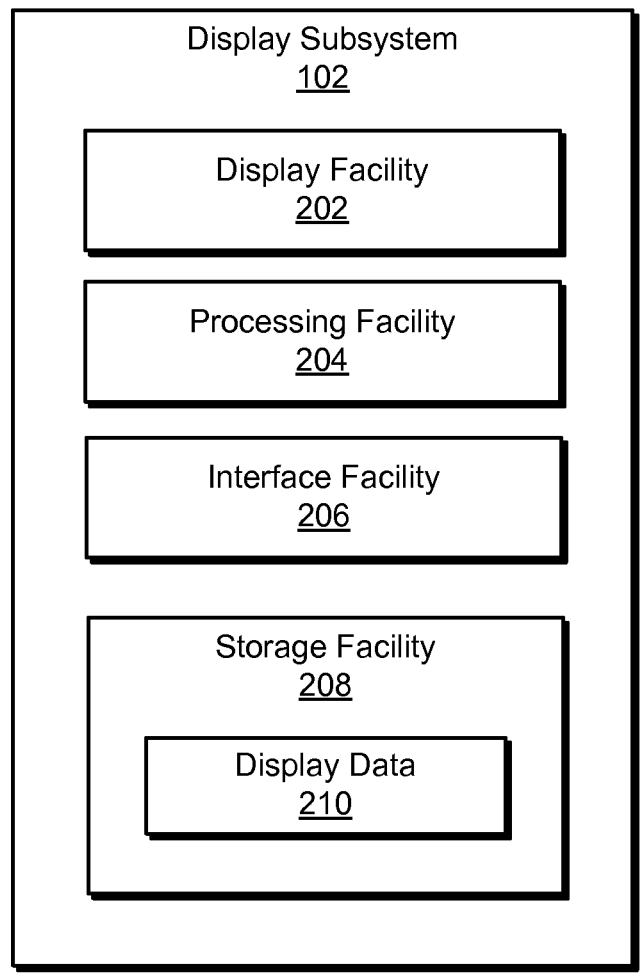
FIG. 2 illustrates components of an exemplary display subsystem according to principles described herein.

FIG. 2 illustrates exemplary components of display subsystem 102. As shown, display subsystem 102 may include, without limitation, a display facility 202, a processing facility 204, an interface facility 206, and a storage facility 208, which may be communicatively coupled to one another using any suitable technologies. While facilities 202-208 are shown to be separate facilities in FIG. 2, any of those facilities may be combined into a single facility as may serve a particular application.

Display facility 202 may include or be connected to a display device configured to provide a display on a display screen of the display device for viewing by a user. The display device may include, without limitation, a flat-panel display device, television, computer monitor, video game display device, wall-mounted display device, or other display device having a display screen on which a display may be presented for viewing by one or more users. A display may include any combination and/or layout of display content, which may include one or more graphical assets (e.g., windows, cursors, icons, text characters, symbols, avatars, two-dimensional images, three-dimensional images, and other graphical objects) presented in the display, application content presented in the display, media content presented in the display, and/or any other content presented in the display. Media content may include, without limitation, any television program, on-demand media program, pay-per-view media program, broadcast media program (e.g., broadcast television program), IPTV media content, advertisement (e.g., commercial), video, movie, video game, image, photograph, or any segment, component, or combination of these or other forms of media content that may be displayed for viewing by a user. Application content may include any content associated with an application running on a computing device, such as server-based application content, content associated with applications that execute on a local processor, video game content, web-based content such as webpage content, and/or any combination or sub-combination thereof that may be displayed for viewing by one or more users.

Display facility 202 may include any hardware, firmware, and/or software configured to facilitate a display of content on a display screen for viewing by one or more users. For example, display facility 202 may include a display device, display screen, display driver(s), graphics engine, and/or other components configured to provide and/or control a display on a display screen. In certain embodiments, display facility 202 may include one or more components of a computing device such as a set-top-box device or a personal computer that are configured to generate and provide data representative of display content to a display device such as a television or a computer monitor for display on a display screen of the display device.

Processing facility 204 may be configured to perform one or more operations associated with display facility 202. For example, processing facility 204 may be configured to execute an application (e.g., a software or firmware application) and provide display content associated with the application to display facility 202 for display on a display screen. Processing facility 202 may include one or more processors configured to perform one or more operations associated with display content and/or other data provided to display facility 202 by processing facility 202.

Interface facility 206 may be configured to provide one or more interfaces by which display subsystem 102 may interface with spatial input subsystem 104. For example, interface facility 206 may provide an interface by which display subsystem 102 may receive data representative of output provided to display subsystem 102 by spatial input subsystem 104. Interface facility 206 may include and/or employ any suitable technologies (e.g., application program interfaces, communication links, callback functions, etc.) to provide such interfaces.

Storage facility 208 may store electronic data maintained and/or accessible by display facility 202, processing facility 204, and/or interface facility 206. For example, storage facility 208 may store display data 210 maintained and/or used by display facility 202 to provide a display on a display screen. Storage facility 208 may additionally or alternatively store other data as may suit a particular implementation.

Figure 3:
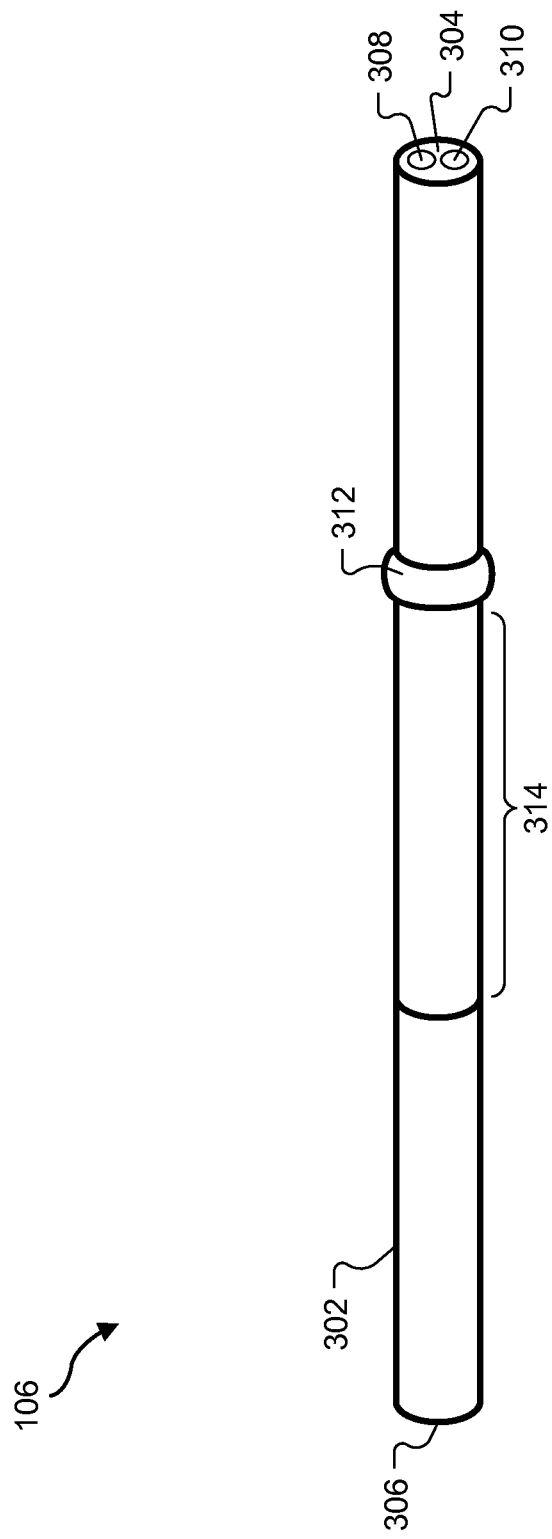
FIG. 3 illustrates an exemplary user input device according to principles described herein.

FIG. 3 illustrates an exemplary implementation of input device 106. As shown, input device 106 may have an elongate shape formed by an elongate outer housing 302 having a front end 304 and a back end 306. In the illustrated example, outer housing 302 is cylindrically shaped, although other shapes may be used in other examples. Outer housing 302 may comprise any material or combination of materials suitable for a handheld input device.

Input device 106 may include a pointing signal source 308 and a selection signal source 310 located at front end 304 of input device 106. In the illustrated example, pointing signal source 308 and selection signal source 310 are each integrated within a surface of front end 304 of input device 106. Pointing signal source 308 and selection signal source 310 may be discrete and separate signal sources.

Pointing signal source 308 may be configured to emit a pointing signal, and selection signal source 310 may be configured to emit a selection signal. Pointing and selection signals may include any signals that may be emitted by input device 106 from within a physical user space and that may be remotely detected by spatial input subsystem 104. In certain implementations, for example, pointing signal and selection signal may each include an infrared signal or a visible light signal. For instance, pointing signal source 308 and selection signal source 310 may include discrete light emitting diodes ("LEDs") configured to illuminate to emit discrete infrared or visible light signals. In alternative implementations, pointing signal source 308 and selection signal source 310 may each be configured to emit another type of signal (e.g., a radio frequency ("RF") or any suitable electromagnetic signal) that may be remotely detected and located by spatial input subsystem 104.

While FIG. 3 shows separate and discrete signal sources 308 and 310, in alternative embodiments, a single signal source may be employed and configured to emit both a pointing signal and a selection signal that may be distinguished from one another by spatial input subsystem 104. For example, light having different attributes may be output by a single signal source of input device 106. For example, the single signal source may be configured to emit a constant pattern of light as a tracking signal and a strobe pattern of light as a selection signal. Other differences in light attributes may be used in other implementations, including, for example, differences in brightness, color, frequency, and/or intensity of light.

Input device 106 may be configured to be held by (or attached to) a user such that front end 304 is pointed at a display screen. Accordingly, a pointing signal and a selection signal emitted by input device 106 may be directed at the display screen. The signals may be directed directly at the display screen and/or in a general direction of the display screen. As described herein, spatial input subsystem 104 may be configured to detect and process pointing and selection signals emitted by input device 106 from within a physical user space and directed at a display screen. Spatial input subsystem 104 may be configured to detect the emitted signals when the signals are directed directly at and/or in a general direction of the display screen.

In certain implementations, input device 302 may be configured to emit a reference signal. As described herein, in certain implementations, spatial input subsystem 104 may be configured to detect and utilize a detected reference signal together with a detected pointing signal to map a position of pointing signal source 306 to a cursor position on a display screen. FIG. 3 illustrates an exemplary reference signal source 312 included in input device 302 and configured to emit a reference signal. In the illustrated example, reference signal source 312 is located along outer housing 302 distant of front end 304 and back end 306. The distance between reference signal source 312 and front end 304 may be sufficient to allow spatial input subsystem 104 to use the detected positions of signal source 312 and pointing signal source 306 to determine a vector representing a direction in which input device 106 is pointing, as described herein. The distance between reference signal source 312 and back end 306 may be sufficient to allow a user's hand to hold input device 302 without obscuring reference signal source 312 from one or more sensors of spatial input subsystem 104. Reference signal source 312 may protrude from and/or encircle outer housing 302 such that reference signal source 312 may be within a line of sight of one or more sensors of spatial input subsystem 104 regardless of the orientation (e.g., yaw, roll, and/or pitch orientation) of input device 106. In the illustrated example, reference signal source 312 includes a ring encircling a portion of cylindrical outer housing 302 of input device 106.

A reference signal may include any signal emitted by reference signal source 312 from within a physical user space and that may be remotely detected by spatial input subsystem 104. In certain implementations, for example, reference signal may include an infrared signal or a visible light signal. For instance, reference signal source 312 may include one or more discrete LEDs configured to illuminate to emit infrared or visible light signals. In alternative implementations, reference signal may be configured to emit another type of signal (e.g., a radio frequency ("RF") or any suitable electromagnetic signal) that may be remotely detected and located by spatial input subsystem 104.

Input device 106 may be configured to selectively emit pointing signals, selection signals, and/or reference signals in response to one or more predefined events. For example, a pointing signal may be emitted in response to an event such as a detection of a user holding input device 106. The detection may be made using a pressure sensor, heat sensor, motion sensor, or any other sensor configured to detect an indication that input device 106 is being held by a user. In certain implementations in which input device 106 includes reference signal source 312, a reference signal may be emitted concurrently with the pointing signal such that spatial input subsystem 104 may consider the pointing and reference signals together. As another example, a selection signal may be emitted in response to an event such as a user squeezing input device 306. For instance, a selection signal may be emitted when a user squeezes a flexible segment 314 of outer housing 302 of input device 106. The emission of the selection signal may be terminated when the user releases the squeezing of flexible segment 314 of outer housing 302.

Figure 4:
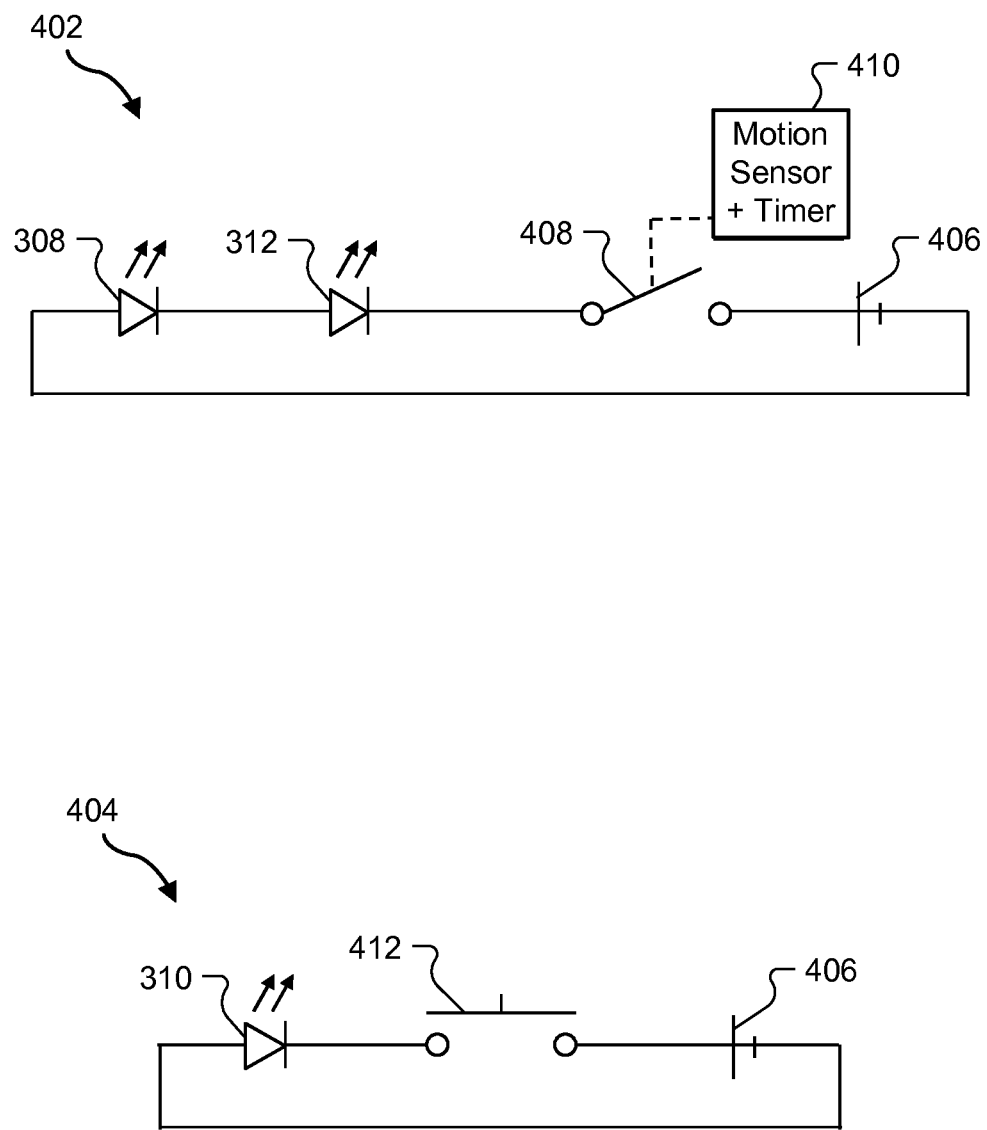
FIG. 4 illustrates exemplary circuits of the user input device shown in FIG. 3 according to principles described herein.

The selective emission of signals by input device 106 may be controlled by electronic circuitry and/or computing logic implemented by input device 106. FIG. 4 illustrates exemplary circuits 402 and 404 that may be included in input device 106 and configured to control emission of signals by input device 106. Circuit 402 may be associated with pointing signal source 308, as well as with reference signal source 312 in some implementations, and may therefore be referred to as "pointing circuit 402." Circuit 404 may be associated with selection signal source 310 and may therefore be referred to as "selection circuit 404."

As shown in FIG. 4, circuit 402 may include a power source 406 (e.g., one or more battery cells) connected in series to pointing signal source 308, reference signal source 312, and a switch 408. Switch 408 may be configured to close to complete circuit 402 such that power from power source 406 is connected and flows to pointing signal source 308 and reference signal source 312 to cause pointing signal source 308 and reference signal source 312 to emit a pointing signal and a reference signal, respectively. Conversely, switch 408 may open such that circuit 402 is open and pointing signal source 308 and reference signal source 312 do not emit their respective signals.

In certain implementations, a motion sensor and timer component 410 (or simply "component 410") may be configured to control switch 408. For example, component 410 may include one or more motion sensors configured to sense movement of input device 106. Component 410 may be configured to cause switch 408 to close in response to a detection of movement of input device 106. In addition, component 410 may be configured to cause switch 408 to reopen when movement of input device 106 is not detected for at least a predetermined time period. Accordingly, when a user picks up input device 106, pointing signal source 308 and reference signal source 312 may automatically begin to emit pointing and reference signals, respectively. Input device 106 may continue to emit the pointing and reference signals until movement of input device 106 is not detected for a predetermined time period. After the user has set down input device 106 and input device 106 is not moved for a predetermined time period, pointing signal source 308 and reference signal source 312 may automatically stop emitting their respective pointing and reference signals.

As further shown in FIG. 4, circuit 404 may include power source 406 connected in series to selection signal source 310 and a switch 412. Switch 412 may be configured to close to complete circuit 404 such that power from power source 406 is connected and flows to selection signal source 310 to cause selection signal source 310 to emit a selection signal. Conversely, switch 412 may open such that circuit 404 is open and selection signal source 310 does not emit a selection signal.

In certain implementations, switch 412 may be configured to close when flexible segment 314 of outer housing 302 is compressed and to open when flexible segment 314 of outer housing 302 is uncompressed. Accordingly, a selection signal may be emitted when a user compresses flexible segment 314 of outer housing 302 of input device 106, and the emission of the selection signal may be terminated when the user releases the compression of flexible segment 314 of outer housing 302.

Figure 5:
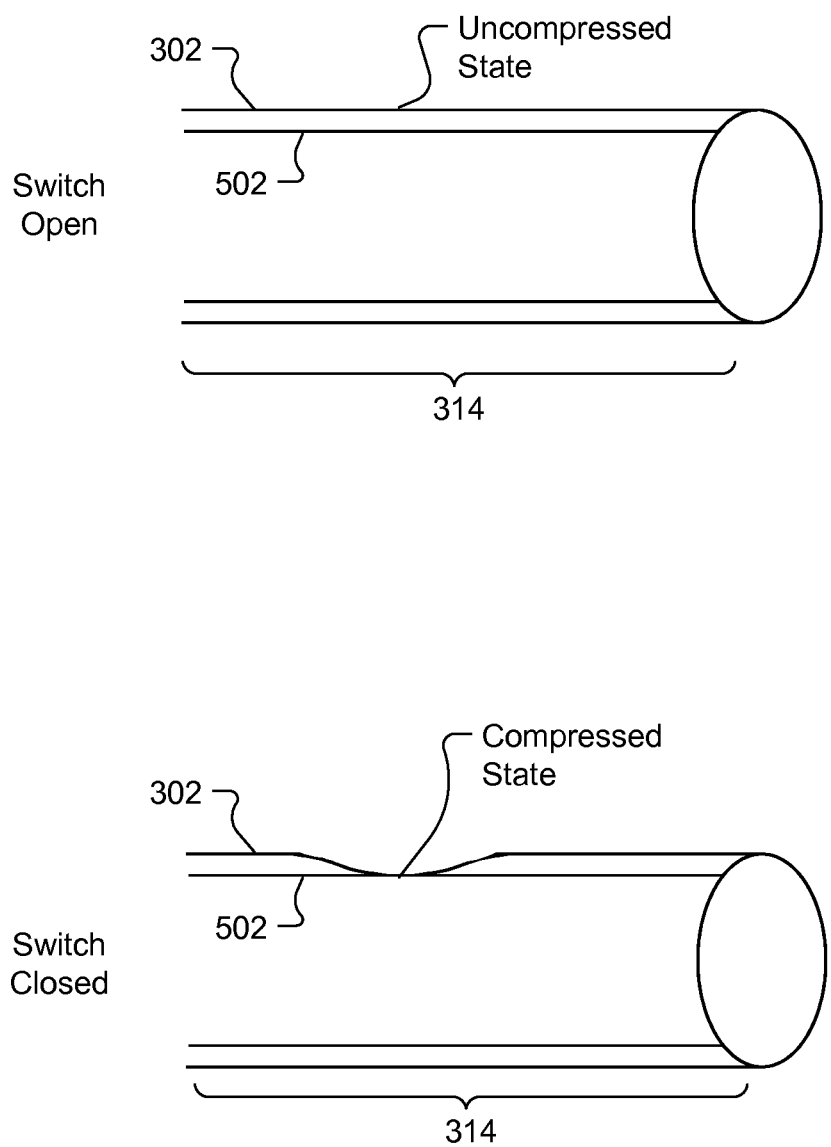
FIG. 5 illustrates a flexible segment of an outer housing of a user input device functioning as a switch according to principles described herein.

FIG. 5 illustrates an example of flexible segment 314 of outer housing 302 functioning as switch 412. As shown, switch 412 may be in an open state when flexible segment 314 of outer housing 302 is uncompressed and not in contact with an inner element 502 of input device 106. Conversely, switch 412 may be in a closed state when flexible segment 314 of outer housing 302 is compressed and in contact with inner element 502 of input device 106. Flexible segment 314 of outer housing 302 may be squeezed by a user with sufficient force to compress flexible segment 314 of outer housing 302 to establish contact between flexible segment 314 of outer housing 302 and inner element 502. When switch 412 is in a closed position, power may be connected to one or more signal sources (e.g., selection signal source 310) to cause the one or more signal sources to emit their respective signals.

Returning to FIG. 4, although not shown in the figure, in certain implementations, input device 106 may include a master switch as part of circuit 402 and/or circuit 404 and configured to override circuit 402 and/or circuit 404 when the master switch is in an "off" position. To illustrate, when a master switch is included in circuit 402 (e.g., in series with switch 408) and is in an open position, a closing of switch 408 will not complete the circuit and signal sources 308 and 312 will not emit their respective signals. Hence, movement of input device 106 will not trigger an automatic emission of signals when the master switch is in an "off" position. Similarly, when a master switch is included in circuit 404 (e.g., in series with switch 412) and is in an open position, a closing of switch 412 will not complete the circuit and signal source 310 will not emit its signal. Hence, compression of flexible segment 314 of outer housing 302 of input device 106 will not trigger an automatic emission of a selection signal when the master switch is in an "off" position.

Spatial input subsystem 104 may be configured to detect and process signals provided by input device 106 from within a physical user space. For example, a pointing signal provided from within the physical user space by input device 106 may be detected and used by spatial input subsystem 104 to map a position within the physical user space (e.g., a position of input device 106 and/or pointing signal source 308) to a cursor position on a display screen associated with display subsystem 104. In addition, a selection signal provided from within the physical user space by input device 106 may be detected and used by spatial input subsystem 104 to detect a selection input command provided by a user of input device 106. Spatial input subsystem 104 may be configured to output data representative of the processed signals (e.g., data representative of a position within the physical user space, a cursor position on a display screen, and/or a selection command) to display subsystem 102, which may be configured to perform one or more operations associated with a display based on the data received from spatial input subsystem 104.

Figure 6:
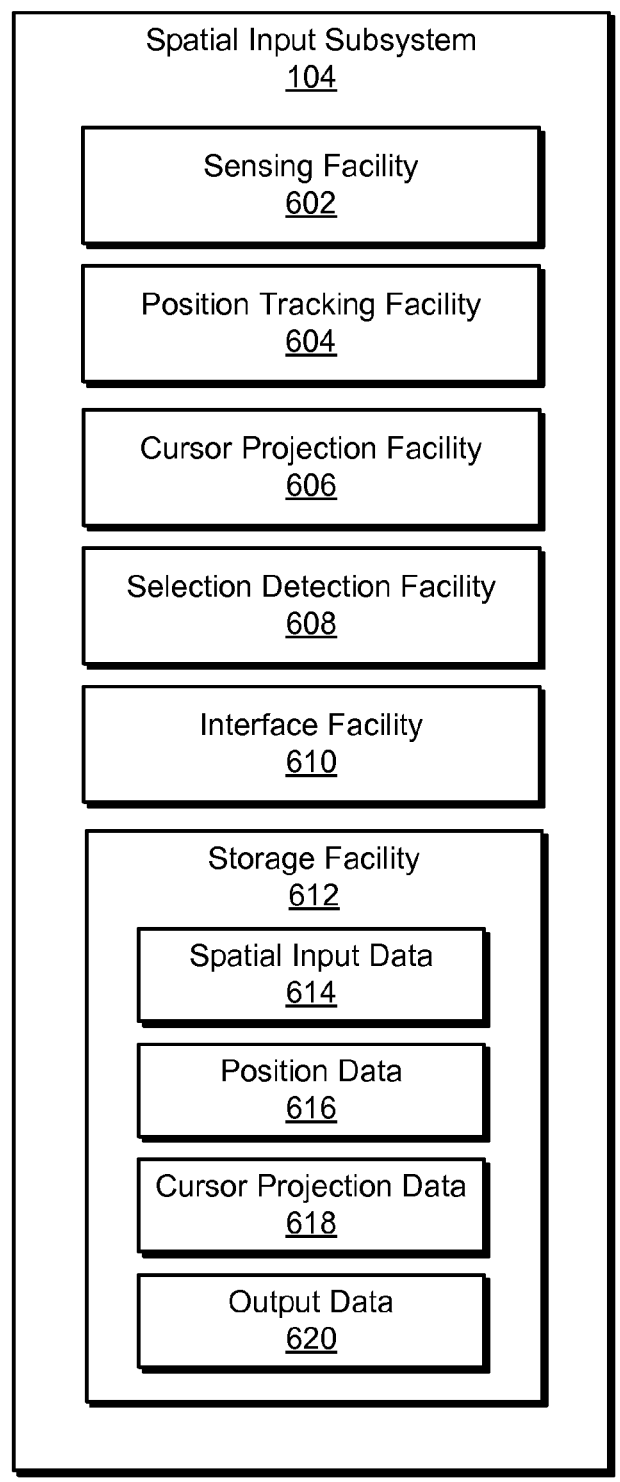
FIG. 6 illustrates components of an exemplary spatial input subsystem according to principles described herein.

FIG. 6 illustrates exemplary components of spatial input subsystem 104. As shown, spatial input subsystem 104 may include, without limitation, a sensing facility 602, a position tracking facility 604, a cursor projection facility 606, a selection detection facility 608, an interface facility 610, and a storage facility 612, which may be communicatively coupled to one another using any suitable technologies. While facilities 602-612 are shown to be separate facilities in FIG. 6, any of those facilities may be combined into a single facility as may serve a particular application.

Sensing facility 602 may be configured to perform any of the spatial input sensing operations described herein, including sensing signals provided by one or more input devices such as input device 106 from within in a physical user space associated with a display screen. Sensing facility 602 may be able to sense signals provided by input device 106 in any suitable way, including, for example, by employing two-dimensional and/or three-dimensional spatial sensing technologies capable of detecting spatial input within the physical user space associated with the display screen. For instance, sensing facility 602 may include a single video camera configured for two-dimensional sensing (e.g., a single Charge-Coupled Device ("CCD") or CMOS-sensor camera configured for two-dimensional sensing), a stereo vision video camera configured for three-dimensional sensing, an array of video cameras configured for high-fidelity three-dimensional sensing, one or more visible light cameras, one or more infrared cameras, any other spatial input sensing technologies, and any combination or sub-combination thereof positioned relative to a display screen so as to monitor the physical user space associated with the display screen.

Position tracking facility 604 may be configured to determine one or more positions within a physical user space based on spatial data sensed by sensing facility 602. For example, position tracking facility 604 may be configured to analyze spatial data in accordance with one or more predefined analysis heuristics to identify one or more positions within the physical user space. To illustrate, in certain implementations, position tracking facility 604 may be configured to analyze spatial data sensed by sensing facility 602 to detect a pointing signal provided by input device 106. Based on the pointing signal, position tracking facility 604 may determine a position within the physical user space, such as a position of input device 106 and/or pointing signal source 308 within the physical user space.

In certain implementations, position tracking facility 604 may be further configured to analyze spatial data sensed by sensing facility 602 to detect a reference signal provided by input device 106. Based on the reference signal, position tracking facility 604 may determine an additional position within the physical user space, such as a position of reference signal source 312 within the physical user space.

In some examples, position tracking facility 604 may be configured to track one or more determined positions within the physical user space over time such that movement of the positions caused by movement of input device 106 may be detected. Such tracking may support a capability of spatial input subsystem 104 to concurrently detect, distinguish, and utilize spatial input provided by multiple input devices from within the physical user space.

Any suitable heuristic(s) may be employed by position tracking facility 604 to determine and/or track one or more positions within a physical user space based on spatial input sensed by sensing facility 602. For example, when signals emitted by input device from within the physical user space include light signals (e.g., infrared and/or visible light signals), heuristics such as, but not limited to, color segmentation heuristics, image processing filter heuristics (e.g., erosion and/or dilation filter heuristics), image subtraction heuristics, pixel matching heuristics, any other image processing heuristics, or any combination or sub-combination thereof may be employed by position tracking facility 604 to determine and/or track one or more positions associated with one or more input devices located in the physical user space. To illustrate, a color segmentation heuristic may be applied to an image to identify light in the image. A pixel matching heuristic may then be applied to identify any matching pixels in the image. If there is more than one matching pixel, one or more image processing filter heuristics may be applied to isolate the target light in the image. The position of the source of the target light may then be estimated by determining a centroid of the matching pixel region. One or more image subtraction heuristics may be applied to help avoid false positive matches for a light source.

Position tracking facility 604 may be configured to determine and represent a position in two-dimensional or three-dimensional space. If sensing facility 602 is configured for two-dimensional sensing, position tracking facility 603 may represent a determined position as a two-dimensional position (e.g., as (x,y) coordinates representing a two-dimensional location within a virtual plane of the physical user space). As described herein, data representative of a two-dimensional position may be used in a plane projection heuristic to map the position to a cursor position on a display screen. If sensing facility 602 is configured for three-dimensional sensing, position tracking facility 604 may represent a determined position as a three-dimensional position (e.g., as (x,y,z) coordinates representing a three-dimensional location within a three-dimensional user space). As described herein, data representative of a three-dimensional position may be used in a vector projection heuristic to map the position to a cursor position on a display screen.

Cursor projection facility 606 may be configured to perform any of the cursor projection operations described herein, including receiving data representative of one or more determined positions within a physical user space from position tracking facility 604 and mapping the position(s) to one or more cursor positions on a display screen. As described herein, the mapping may be performed by cursor projection facility 606 based on at least one of a plane projection heuristic and a vector projection heuristic. These projection heuristics, used alone or in combination, may determine cursor position on a display screen based on one or more signals emitted by user device 106 from within the physical user space in ways that provide for efficient mapping of the signal (s) to one or more cursor positions.

The term "cursor position" as used herein may refer to any position on a display screen that is mapped from spatial input and that may be used as input to and/or to control one or more operations of and/or applications running on a computing system associated with the display screen. The term "cursor" or "cursor object" as used herein may refer to any invisible or displayed object associated with a cursor position on a display screen. The term "cursor projection" may refer to any mapping of spatial input to one or more cursor positions of one or more cursors on a display screen.

Selection detection facility 608 may be configured to analyze spatial data sensed by sensing facility 602 to detect spatial input representative of one or more selection input commands. To illustrate, in certain implementations, selection detection facility 608 may be configured to analyze spatial data sensed by sensing facility 602 to detect a selection signal provided by input device 106 and determine that the selection signal represents a selection command input by a user utilizing input device 106.

Any suitable heuristics may be employed by selection detection facility 608 to detect a selection signal within a physical user space based on spatial input sensed by sensing facility 602. For example, when signals emitted by input device 106 from within the physical user space include light signals (e.g., infrared and/or visible light signals), heuristics such as any of those mentioned above may be employed by selection detection facility 608 to detect a selection signal emitted by input device 106.

Interface facility 610 may be configured to provide one or more interfaces by which spatial input subsystem 104 may interface with display subsystem 102. For example, interface facility 610 may provide an interface by which spatial input subsystem 104 may output data to display subsystem 102. Interface facility 610 may include and/or employ any suitable technologies (e.g., application program interfaces, communication links, etc.) to provide such interfaces.

Interface facility 610 may obtain data for output to display subsystem 102 from any of sensing facility 602, position tracking facility 604, cursor projection facility 606, selection detection facility 608, and storage facility 612, each of which may be configured to provide data to interface facility 610. For example, interface facility 610 may obtain data representative of sensed spatial data, one or more determined positions within a physical user space, one or more cursor positions on a display screen, and/or one or more selection input commands from any of sensing facility 602, position tracking facility 604, cursor projection facility 606, selection detection facility 608, and storage facility 612. Interface facility 610 may further provide any of the obtained data to display subsystem 102 for use by the display subsystem 102 to perform one or more operations associated with a display based on the data. To illustrate, interface facility 610 may provide data representative of a cursor position, which has been mapped from a position within a physical user space, to display subsystem 102 for use by display subsystem 102 in positioning and/or displaying a cursor object at the cursor position within the display. Interface facility 610 may further provide data representative of a selection command associated with a selection signal, which has been detected by selection detection facility 608, to display subsystem 102 for use by display subsystem 102 to perform one or more operations based on the selection command.

Storage facility 612 may store electronic data maintained and/or accessible by sensing facility 602, position tracking facility 604, cursor projection facility 606, selection detection facility 608, and/or interface facility 610. For example, storage facility 612 may store spatial input data 614 representative of spatial data sensed by sensing facility 602, position data 616 representative of one or more positions determined by position tracking facility 604, cursor projection data 618 representative of one or more cursor positions determined by cursor projection facility 606, and output data 620 representative of data to be output or that has been output by interface facility 610 to display subsystem 102. Storage facility 612 may also store data representative of one or more heuristics described above for use by sensing facility 602, position tracking facility 604, cursor projection facility 606, and/or selection detection facility 608. Storage facility 612 may additionally or alternatively store other data as may suit a particular implementation.

Figure 7:
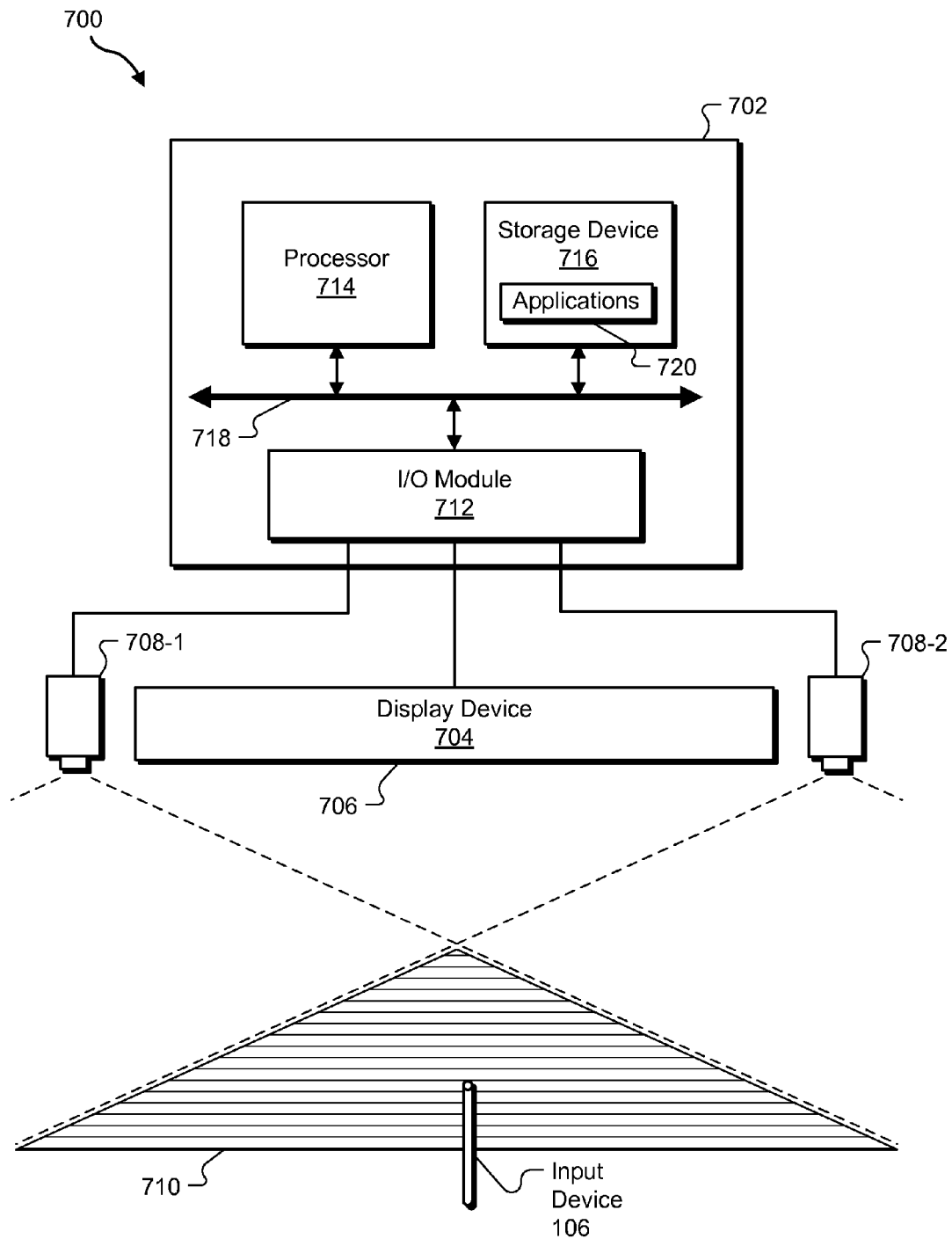
FIG. 7 illustrates a view of an exemplary implementation of the system of FIG. 1 according to principles described herein.

FIG. 7 illustrates a view of an exemplary implementation 700 of system 100 in which a computing device 702 may be communicatively coupled to and configured to drive a display device 704 by providing one or more signals that may be utilized by display device 704 to generate and provide a display on a display screen 706 of display device 704. Computing device 702 may also be communicatively coupled to and configured to receive input signals from a set of one or more sensing devices 708 (e.g., sensing devices 708-1 and 708-2) that are strategically positioned relative to display screen 706 (e.g., a certain distance from either side of display device 704). Each sensing device 708 may be configured to sense spatial input provided within a sensing space, such as one or more signals emitted by input device 106 from within the sensing space. A sensing space associated with each sensing device 708 is delineated by dashed lines extending away from each sensing device 708 in FIG. 7. An intersection of the sensing spaces associated with sensing devices 708 may form an overall sensing space 710 for the set of sensing devices 708. In FIG. 7, the overall sensing space 710 is depicted by a pattern of horizontal lines within an area of intersection of the sensing spaces of sensing devices 708-1 and 708-2. FIG. 7 shows a top view of the overall sensing space 710, which may be a three-dimensional space positioned in front of the display screen 706 of display device 704. Sensing devices 708 may be positioned such that the overall sensing space 710 includes and/or coincides with a physical user space typically occupied by one or more users when viewing the display screen 706 of display device 704. In certain embodiments, sensing devices 708 may be physically integrated within display device 704. In other embodiments, sensing devices 708 may be physically separate from display device 704.

In certain embodiments, sensing devices 708 may include a set of video cameras. Each camera in the set of cameras may be configured to capture video frame images within a field of view of the camera. In such embodiments, a field of view associated with each camera is delineated by dashed lines extending from each camera in FIG. 7. An intersection of the views associated with the cameras may form an overall field of view for the set of cameras. In FIG. 7, the overall field of view is equivalent to overall sensing space 710.

While FIG. 7 illustrates a two-sensor (e.g., a two-camera) sensing configuration that allows for three-dimensional sensing, this is illustrative only. Other configurations may be used in other embodiments. For example, a single-sensor (e.g., a single-camera) configuration may be employed and used for two-dimensional sensing.

Display device 704 may include any device configured to provide a display on display screen 706. Computing device 702 may include any device configured to drive display device 704 and update a display shown on display screen 706 of display device 704 based on spatial input. In certain embodiments, computing device 702 may include a set-top-box device and display device 704 may include a television connected to the set-top-box device. In other embodiments, computing device 702 may include a computer and display device 704 may include a monitor connected to the computer. In yet other embodiments, computing device 702 may include a gaming console and display device 704 may include a television or other display device connected to the gaming console. In yet other embodiments, computing device 702 may include a mobile computing device such as a mobile phone or mobile entertainment device.

Computing device 702 may include an input/output ("I/O") module 712, a processor 714, and a storage device 716 communicatively coupled one to another via a communication infrastructure 718. The components of computing device 702 may communicate with one another, including sending data to and receiving data from one another, using any suitable communication technologies. While exemplary components of computing device 702 are shown in FIG. 7, the components illustrated in FIG. 7 are not intended to be limiting. Additional or alternative components may be used in other embodiments. Components of the computing device 702 shown in FIG. 7 will now be described in additional detail.

I/O module 712 may be configured to transmit output signals and receive input signals to/from one or more other devices. For example, I/O module 712 may be configured to receive sensing data from sensing devices 708 (e.g., image data from cameras) and to output display signals to display device 704 to generate a display on display screen 706. I/O module 712 may include any suitable hardware, firmware, and/or software for transmitting output signals and receiving input signals to/from display device 704 and sensing devices 708. I/O module 712 may be connected to display device 704 and sensing devices 708 using any suitable technologies, such as IEEE 1394, DVI, HDMI, VGA, component video, Ethernet, USB, wireless, analog, digital, and/or other connections.

Processor 714 generally represents any type or form of processing unit capable of processing data or interpreting, executing, and/or directing execution of one or more of the instructions, processes, and/or operations described herein. Processor 714 may direct execution of operations in accordance with one or more applications 720 or other computer-executable instructions such as may be stored in storage device 716 or another computer-readable medium. As an example, processor 714 may be configured to process data, including processing sensing data received from sensing devices 708 (e.g., processing raw image data received from cameras) in any of the ways described herein.

Storage device 716 may include one or more data storage media, devices, or configurations and may employ any type, form, and combination of data storage media and/or device. For example, storage device 716 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 716. For example, data representative of one or more executable applications 720 configured to direct processor 714 to perform any of the operations described herein may be stored within storage device 716.

In some examples, display subsystem 102 and/or spatial input subsystem 104 may be partially or fully implemented by or within one or more components of computing device 702. For example, one or more applications 720 residing within storage device 716 may be configured to direct processor 714 to perform one or more processes or functions associated with display subsystem 102 and/or spatial input subsystem 104.

As mentioned, cursor projection facility 606 may be configured to map a position within a physical user space (e.g., within a space defined by or otherwise coinciding with overall sensing space 710) to a cursor position on a display screen (e.g., display screen 706) based on at least one of a plane projection heuristic and a vector projection heuristic. Each of these heuristics, which may specify, perform, and/or control one or more of the cursor projection operations disclosed herein, will now be described in detail.

For cursor projection based on a plane projection heuristic, cursor projection facility 606 may be configured to project a virtual plane within a physical user space in which spatial input may be detected. The projected virtual plane, which may be an invisible plane positioned at a comfortable distance in front of a user who is located in the physical user space, may represent a virtual projection of a physical display screen into the physical user space. The user may place and/or move an object, such as front end 304 of input device 106 shown in FIG. 3, on the virtual plane. A position of front end 304 of input device 106 on the virtual plane may be detected by position tracking facility 604 and used by cursor projection facility 606 to determine a position on a display screen at which a cursor is to be placed. Accordingly, the user may control placement and/or movement of a cursor on the display screen by placing and/or moving front end 304 of input device 106 on or across the projected virtual plane.

Figure 8:
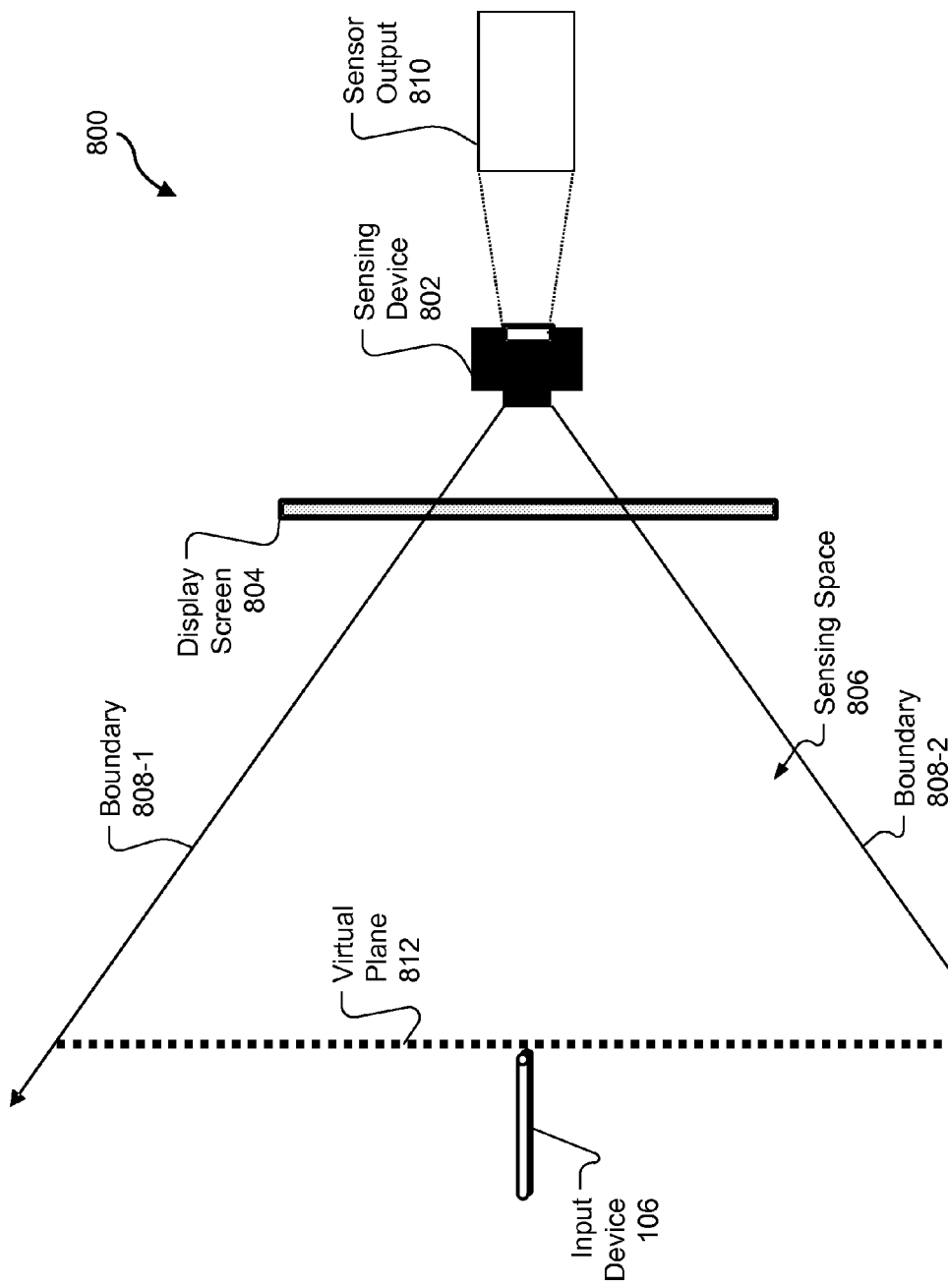
FIG. 8 illustrates an exemplary plane projection implementation of the system of FIG. 1 according to principles described herein.

To illustrate, FIG. 8 shows a view of an exemplary plane-projection-based implementation 800 of system 100 in which a sensing device 802 positioned relative to a display screen 804 may be configured to detect spatial input within a sensing space 806 defined by peripheral boundaries 808 (e.g., boundaries 808-1 and 808-2) of sensing device 802, which may generate sensor output 810 representing the detected spatial input.

A virtual plane 812 may be projected within sensing space 806 at any distance from display screen 804 that is within range of sensing device 802. The boundaries of virtual plane 812 may be defined by peripheral boundaries 808 of sensing device 802 and the distance of virtual plane 812 from display screen 804 and/or sensing device 802. The distance of virtual plane 812 from display screen 804 and/or sensing device 802 may be determined based on the distance of input device 106 from display screen 804 and/or sensing device 802. For example, sensing device 802 may detect a signal emitted by input device 106 within the sensing space 806, and spatial input subsystem 104 may project virtual plane 812 at a specific distance from display screen 804 and/or sensing device 802 such that front end 304 of input device 106 is positioned on virtual plane 812. Hence, the position of virtual plane 812 with respect to display screen 804 may dynamically shift (e.g., shift closer to or farther from display screen 804) depending on the position of input device 106 within sensing space 806. Virtual plane 812 is normally projected such that its orientation is parallel to display screen 804. Such an orientation may help facilitate mapping of positions on virtual plane 812 to positions on display screen 804.

A user holding input device 106 may provide spatial input on or across virtual plane 812. For example, input device 106 may emit a pointing signal at a position on virtual plane 812. Spatial input subsystem 104 may detect the pointing signal, determine the position of the source of the pointing signal on virtual plane 812, map the position of the pointing signal source on virtual plane 812 to a cursor position on display screen 804, and execute an operation based on the cursor position (e.g., display a cursor at the position on the display screen 804). In addition, the user may move input device 106 across virtual plane 812 to cause the cursor to be moved in corresponding fashion on display screen 804. If the user moves input device 106 outside of the boundaries of virtual plane 812 (e.g., outside of peripheral boundaries 808 of sensing space 806), the source of the pointing signal emitted by input device 106 may not be determined by sensing device 802 and may not produce a display of a valid cursor on display screen 804.

Positions on virtual plane 812 may be mapped to positions on display screen 804 in any suitable way specified by the plane projection heuristic. In certain embodiments, for example, virtual plane 812 may include an array of positions on virtual plane 812 that may be mapped to a sensor array associated with sensing device 802. The sensor array may be mapped to an output array associated with sensor output 810 (e.g., an output array representing output of sensing device 802, such as an image array output by a camera sensing device 802), and the output array may be mapped to a display array associated with display screen 804. The display array may correspond with positions on display screen 804. Accordingly, a position of pointing signal source 608 of input device 106 on virtual plane 812 may generate a corresponding position on the sensor array, the position on the sensor array may generate a corresponding position on the output array, and the position on the output array may be used to determine a corresponding position on the display array, which may indicate a position on a display screen at which a cursor may be displayed.

Various mapping heuristics may be defined by plane projection heuristic and used to map positions between the arrays in association with a virtual plane (e.g., virtual plane 812). In certain implementations, plane projection heuristic may define and use any of the mapping heuristics and/or operations described in co-pending U.S. patent application Ser. No. 12/771,446, entitled "SPATIAL-INPUT-BASED CURSOR PROJECTION SYSTEMS AND METHODS," filed Apr. 30, 2010, and incorporated herein by reference in its entirety.

Returning to FIG. 8, virtual plane 812 is shown to extend across sensing space 806 between boundaries 808 and parallel to display screen 804. In such examples, an entire cross-section of sensing space 806 parallel to display screen 804 may make up virtual plane 812 and may be configured to function as a single active region across in which spatial input may be detected. In other examples, one or more active sub-regions may be projected at one or more distinct planar areas located within sensing space 806. A sub-region may include any subset of a cross-section of sensing space 806 parallel to display screen 804. Thus, a sub-region may form a virtual plane that is smaller than an entire cross-section of sensing space 806.

Figure 9:
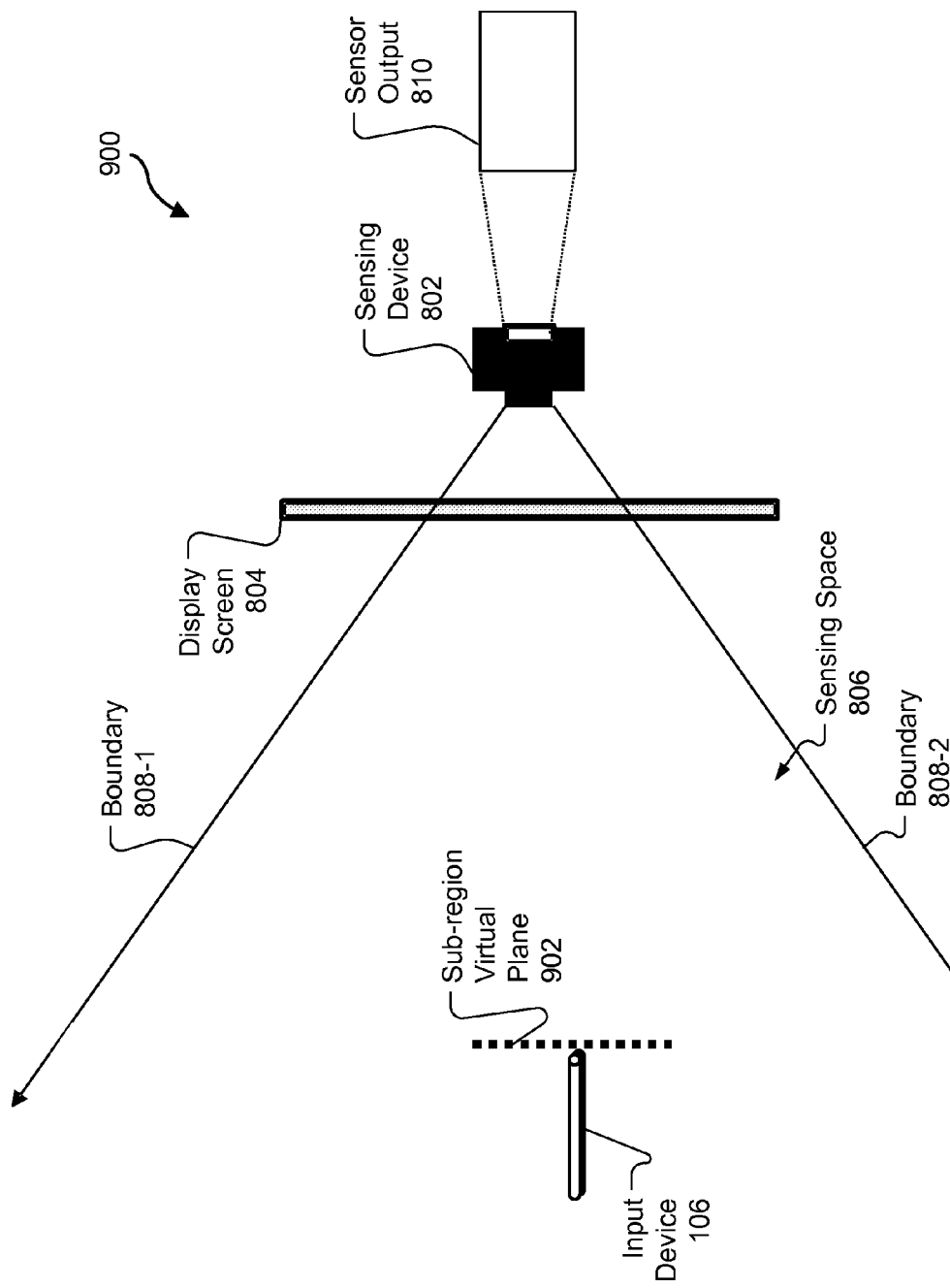
FIG. 9 illustrates another exemplary plane projection implementation of the system of FIG. 1 according to principles described herein.

FIG. 9 illustrates a view of another exemplary plane-projection-based implementation 900 of system 100. Implementation 900 is similar to implementation 800 of FIG. 8 except that in place of a projection of a full-size virtual plane 812 that extends between peripheral boundaries 808-1 and 808-2 as shown in FIG. 8, a sub-region virtual plane 902 is projected within sensing space 806. As shown, sub-region virtual plane 902 is a subset of a cross-section of sensing space 806 and does not extend all the way between peripheral boundaries 808-1 and 808-2.

A sub-region virtual plane such as sub-region virtual plane 902 of FIG. 9 may define an active input plane having a size that allows a user wielding input device 106 to conveniently and/or comfortably control one or more cursors on display screen 804, even when the user is located a significant distance away from display screen 804 and/or sensing device 802. At such a distance, a cross-section of sensing space 806 near the user may be larger than the space that is within comfortable reach of the user. Such a configuration may be highly inconvenient and/or impractical for receiving spatial input from input device 106 held by the user. For example, if the user is sitting on a sofa a certain distance from a television display screen, the user may be required to physically move from one end of the sofa to the other end of the sofa in order to cause a cursor to move across the television display screen. To provide a more convenient and/or practical configuration for receipt of spatial input from a user holding input device 106, sub-region virtual plane 902 may be projected and may have a size configured to accommodate convenient and/or comfortable spatial input provided by input device 106.

Positions on sub-region virtual plane 902 may be mapped to positions on display screen 804 based on a plane projection heuristic in any suitable way, including in any of the ways described above and/or based on a sequence of linear transformations. In certain embodiments, for example, sub-region virtual plane 902 may include an array of positions on sub-region virtual plane 902 that may be mapped to a sensor array associated with sensing device 802. The sensor array may be mapped to an output array associated with sensor output 810, and the output array may be mapped to a display array associated with display screen 804. The display array may correspond with positions on display screen 804. Accordingly, a position of pointing signal source 608 of input device 106 on sub-region virtual plane 902 may generate a corresponding position on the sensor array, the position on the sensor array may generate a corresponding position on the output array, and the position on the output array may be used to determine a corresponding position on the display array, which may indicate a position on a display screen at which a cursor may be displayed.

Various mapping heuristics may be defined and used to map positions between the arrays in association with one or more sub-region virtual planes (e.g., sub-region virtual plane 902). In certain implementations, plane projection heuristic may define and use any of the mapping heuristics and/or operations described in the above-mentioned co-pending U.S. patent application Ser. No. 12/771,446 filed on Apr. 30, 2010.

Cursor projection facility 606 may be configured to provide one or more calibration modes and/or tools configured to facilitate user calibration of a plane projection heuristic, including calibration of one or more virtual planes and their mappings to a display screen. Accordingly, a user may provide input to configure a virtual plane in a way that accounts for user preferences, abilities, and/or location. User calibration tools may be especially useful for facilitating user definition of sub-region virtual planes.

In certain embodiments, for example, cursor projection facility 606 may be configured to execute a calibration mode configured to facilitate a calibration of a plane projection heuristic. Cursor projection facility 606 may be configured to execute the calibration mode in response to any predefined event. For example, a calibration tool or an option to launch a calibration tool may be automatically presented for use by a user in response to a detection of spatial input that is associated with a request for projection of a cursor on display screen 804. For instance, in response to an initial detection of a pointing signal emitted by a input device 106 from within sensing space, spatial input subsystem 104 may present a calibration tool or an option to launch a calibration tool for use by the user to calibrate a sub-region virtual plane.

The calibration tool may be presented in any form suitable for use by the user to calibrate or re-calibrate a virtual plane. For example, spatial input subsystem 104 may present one or more calibration prompts configured to guide the user through a calibration dialog with spatial input subsystem 104. Such prompts may be audible and/or visual instructions configured to direct the user to utilize input device 106 to provide one or more signals that may be used by spatial input subsystem 104 to define a virtual plane. In some examples, the visual instructions may be presented on display screen 804 and may depict actions to be performed by the user to define a virtual plane. When the user performs the one or more actions to provide the one or more signals in the context of the calibration dialog during execution of the calibration mode, spatial input subsystem 104 may detect the signals for calibrating a virtual plane, and define the virtual plane based on the detected signals.

As an example, an exemplary calibration tool may be configured to direct the user to utilize input device 106 to provide signals that spatially indicate one or more boundary locations of a virtual plane. For instance, the user may be directed to utilize input device 106 to provide signals at opposing corners of a virtual plane (e.g., an upper left corner defined as UL= $(x_{left}, y_{top})$ and a lower right corner defined as LR=$(x_{right}, y_{bottom})$). To illustrate, in a user calibration dialog, the user may be directed to position input device 106 at a comfortable upper left point and squeeze input device 106 to provide a selection signal when input device 106 is at the comfortable upper left point to mark that position as the upper left corner of a virtual plane. The user may then be directed to similarly mark the lower right corner of the virtual plane. Corner positions marked in this manner may be used by spatial input subsystem 104 to define a rectangle-shaped virtual plane, which may be a sub-region virtual plane that represents a space in which the user may conveniently and/or comfortably utilize input device 106 to provide spatial input for detection and use by spatial input subsystem 104.

The above-described example is illustrative only. Other suitable spatial input may be defined for use by the user to define a virtual plane in a calibration mode. For example, spatial input subsystem 104 may direct the user utilize input device 106 to physically draw a shape (e.g., a rectangle, oval, or circle) of a virtual plane. Other predefined spatial input may be used for calibration of a virtual plane in other embodiments.

In response to user input received during execution of the calibration mode, spatial input subsystem 104 may define a virtual plane (e.g., a sub-region virtual plane) based on the user input and calibrate the plane projection heuristic for mapping of the virtual plane to display screen 804. The above-described calibration may be repeated to calibrate multiple sub-region virtual planes for concurrent use among multiple users in detecting and mapping spatial input to display screen 804.

Cursor projection facility 606 may be configured to support isomorphic or polymorphic plane projection. In isomorphic plane projection, display screen positions may map to virtual plane positions on a one-to-one basis. Hence, a position on display screen 804 may map to only one position within sensing space 806. Accordingly, isomorphic plane projection may be suitable for use when only a single virtual plane is active.

Figure 10:
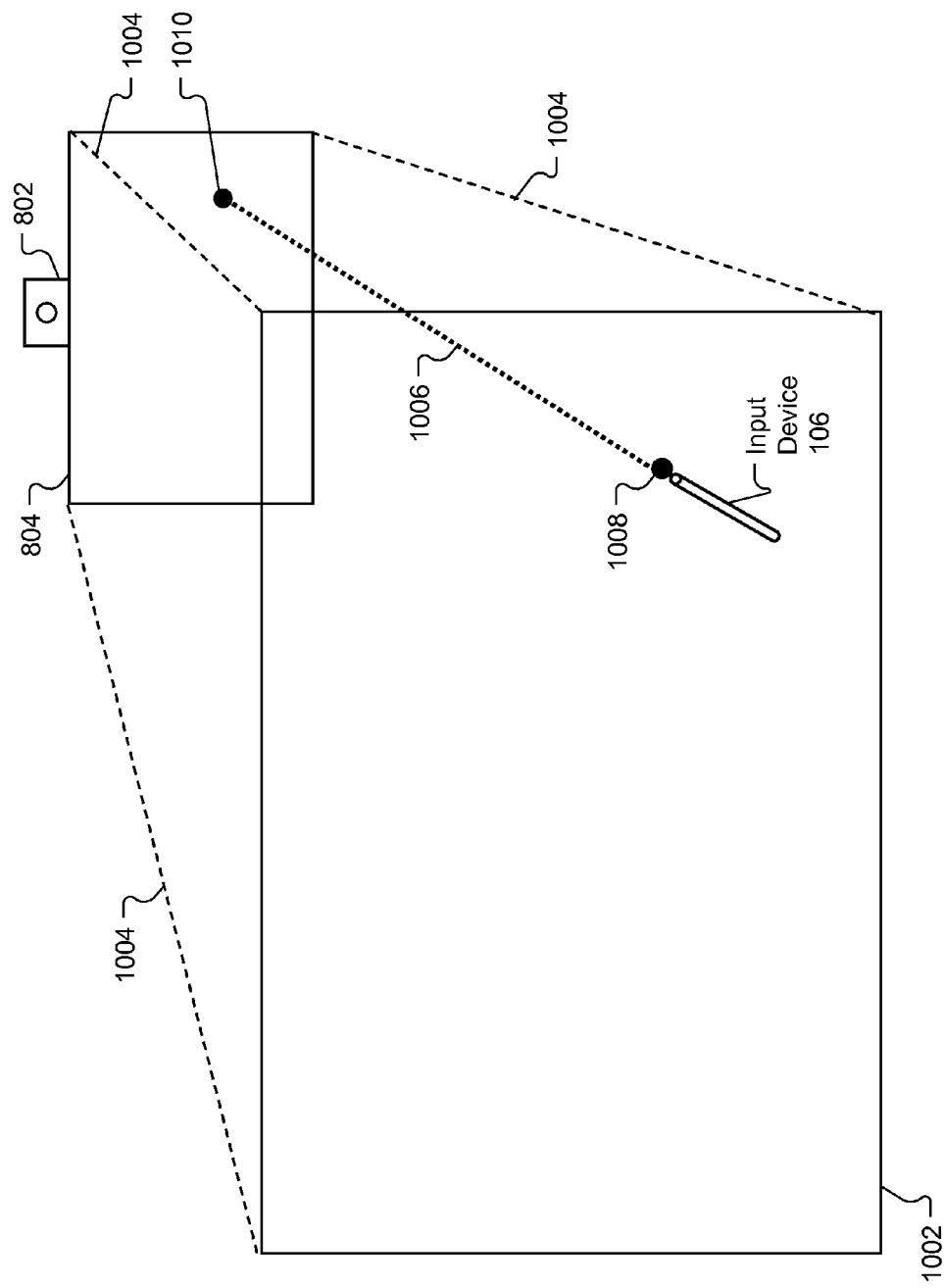
FIG. 10 shows an example of isomorphic plane projection according to principles described herein.

To illustrate, FIG. 10 shows an example of isomorphic plane projection. In the illustrated example, a user may utilize input device 106 to provide a pointing signal at a position on a virtual plane 1002, which may be a full-size virtual plane or a sub-region virtual plane as described above. Positions on virtual plane 1002 may be mapped to positions on display screen 804 based on a plane projection heuristic and on a one-to-one basis as illustrated by the dashed lines in FIG. 10. Dashed lines 1004 may represent one-to-one mapping of corner positions of virtual plane 1002 with respective corner positions of display screen 804. Dashed line 1006 may represent a one-to-one mapping of a position 1008 of a source of a pointing signal emitted by input device 106 on virtual plane 1002 with a position 1010 on display screen.

In polymorphic plane projection, display screen positions may map to positions within sensing space 806 on a one-to-many basis. Hence, a position on display screen 804 may map to multiple positions within sensing space 806. Accordingly, polymorphic plane projection may be suitable for use when multiple user inputs for cursor projection are provided within sensing space 806, such as when multiple users are operating input devices in discrete sub-region virtual planes within sensing space and/or when multiple inputs are provided on a single active virtual plane (e.g., when a user utilizes multiple input devices to indicate multiple positions on virtual plane 1002).

Figure 11:
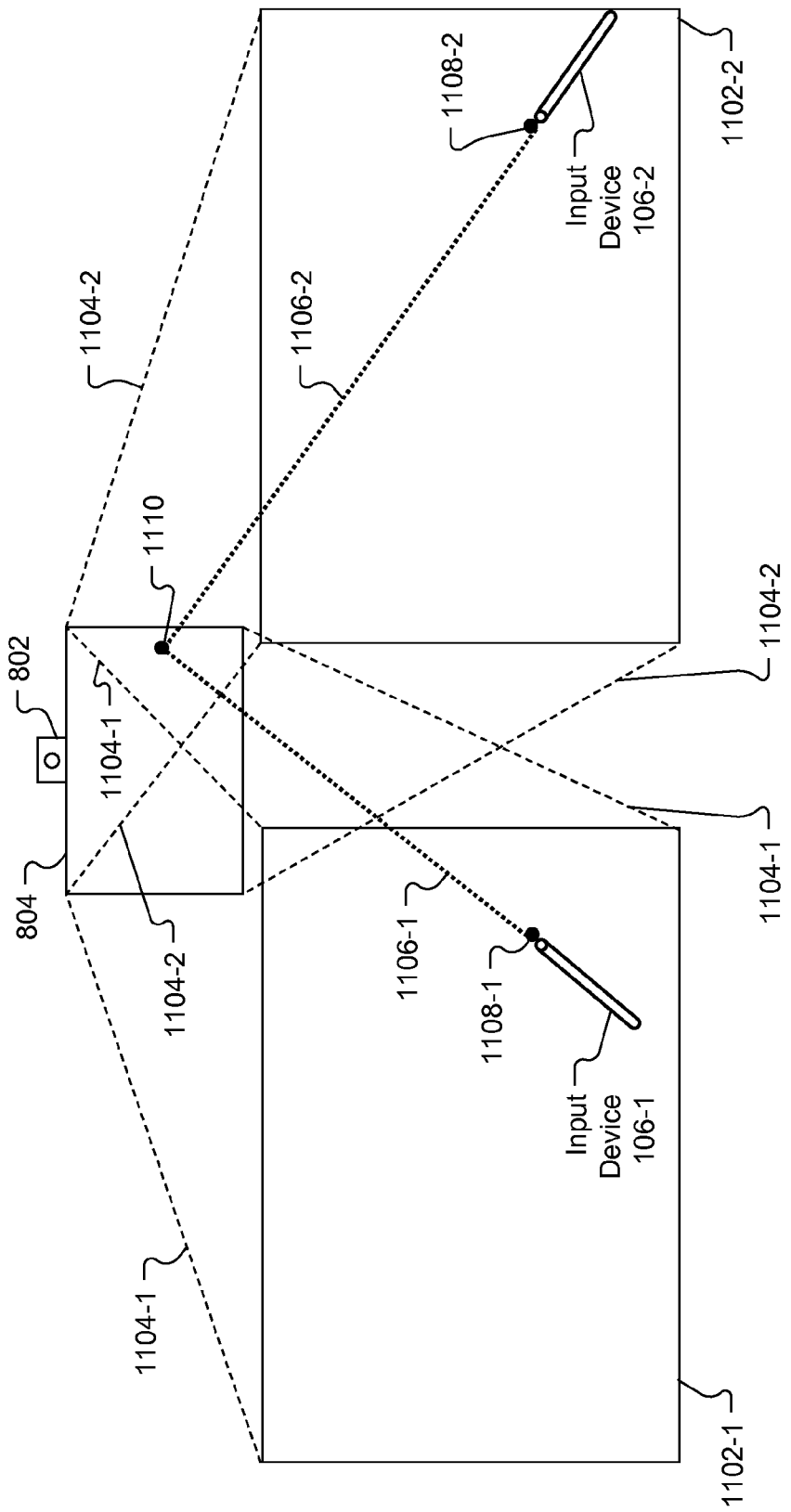
FIG. 11 shows an example of polymorphic plane projection according to principles described herein.

To illustrate, FIG. 11 shows an example of polymorphic plane projection. In the illustrated example, two users may utilize two input devices 106-1 and 106-2, respectively, to provide spatial input on two respective sub-region virtual planes 1102-1 and 1102-2. Positions on sub-region virtual plane 1102-1 may map to positions on display screen 804 as illustrated by dashed lines connecting sub-region virtual plane 1102-1 to display screen 804 in FIG. 11. Dashed lines 1104-1 may represent mappings of corner positions of sub-region virtual plane 1102-1 with respective corner positions of display screen 804. Dashed line 1106-1 may represent a mapping of a position 1108-1 of a source of a pointing signal emitted by input device 106-1 on sub-region virtual plane 1102-1 with a position 1110 on display screen 804. In addition, positions on sub-region virtual plane 1102-2 may map to positions on display screen 804 as illustrated by dashed lines connecting sub-region virtual plane 1102-2 to display screen 804 in FIG. 11. Dashed lines 1104-2 may represent mappings of corner positions of sub-region virtual plane 1102-2 with respective corner positions of display screen 804. Dashed line 1106-2 may represent a mapping of a position 1108-2 of a source of a pointing signal emitted by input device 106-2 on sub-region virtual plane 1102-2 with position 1110 on display screen 804.

While sub-region virtual planes 1102-1 and 1102-2 are illustrated as being positioned at entirely distinct planar area locations within sensing space 806, this is illustrative only. Other active sub-region virtual planes may overlap and/or may be located at various distances from display screen 804 in other examples.

Figure 12:
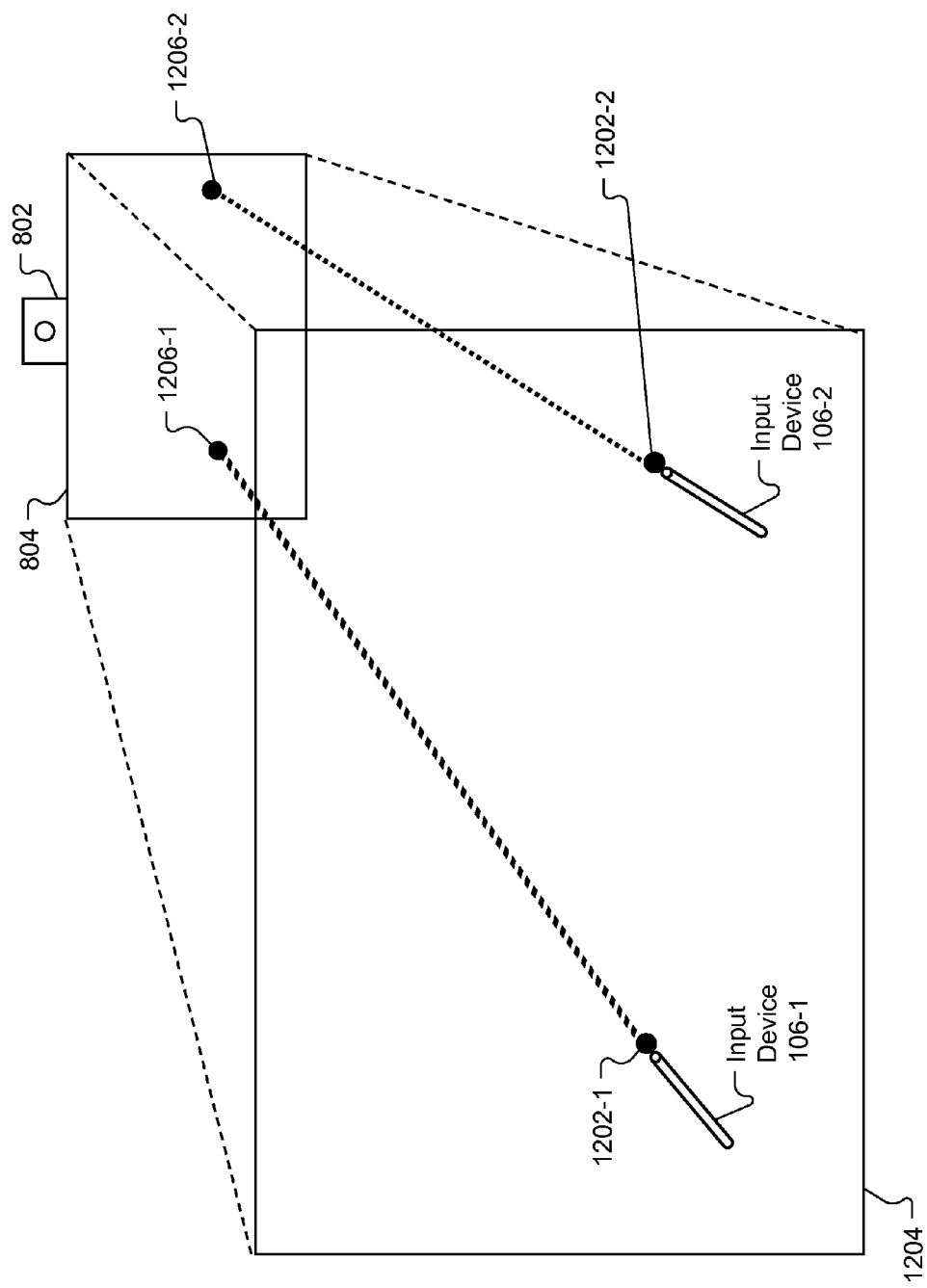
FIG. 12 illustrates an example of a mapping of multiple positions on a virtual plane to multiple cursor positions on a display screen according to principles described herein.

In certain embodiments, spatial input subsystem 104 may be configured to support concurrent mapping of multiple positions on a virtual plane to multiple respective positions on display screen 804. For example, cursor projection facility 606 may be configured to map positions of multiple pointing signal sources emitting multiple pointing signals to multiple corresponding cursor positions on display screen 804. FIG. 12 illustrates an example of a mapping of multiple positions 1202 (e.g., positions 1202-1 and 1202-2) on a virtual plane 1204, which may be a full-size virtual plane or sub-region virtual plane as described above, to multiple corresponding cursors positions 1206 (e.g., 1206-1 and 1206-2) on display screen 804.

The capability to concurrently map multiple input positions on a virtual plane to multiple cursor positions on display screen 804 based on a plane projection heuristic may support a wide range of input combinations that may be applied to control operation of one or more applications executed by display subsystem 102. As an example, a user may position multiple input devices (e.g., input devices 106-1 and 106-2) to emit respective pointing signals from multiple positions on a virtual plane. The positions may be detected and mapped to multiple cursor positions on display screen 804. The cursor positions and/or movement of the cursor positions may be used to control operations of an application.

In certain embodiments, a relationship of multiple cursors on a display screen may be configured to trigger execution of one or more predetermined operations. For example, if a user utilizes two input devices (e.g., input devices 106-1 and 106-2) to emit two respective pointing signals from two positions on a virtual plane, spatial input subsystem 104 may map the two positions on the virtual plane to two respective positions on display screen 804. System 100 may be configured to detect when the two positions on display screen 804 satisfy one or more criteria indicative of a predefined relationship. When the predefined relationship is determined to exist, system 100 may initiate one or more predetermined operations. For instance, when the two positions on display screen 804 come together at a common position or within a minimum screen distance of one another, system 100 may respond by initiating one or more predetermined operations.

For cursor projection based on a vector projection heuristic, in response to a detection of spatial input associated with a request for cursor projection (e.g., a first detection of a pointing signal and a reference signal emitted by input device 106 from within a physical user space), cursor projection facility 606 may identify predefined reference points associated with the spatial input in sensing space 806, use the predefined reference points to determine a three-dimensional ("3D") vector (e.g., a vector in 3D space), and map the vector to a position on a display screen (e.g., by computing a point of intersection of the vector with the display screen and setting the intersection point as a cursor position on the display screen). An operation may be executed based on the determined cursor position on the display screen. For example, a cursor may be displayed at the position on the display screen.

For vector-based cursor projection, a three-dimensional sensing technology, such as stereo vision provided by two or more cameras, is typically used such that three-dimensional locations of predefined reference points associated with input device 106 may be detected and used to compute a vector formed by the reference points. In such technologies, the use of more sensing devices will generally increase the accuracy of the computed vector and therefore of the resulting cursor locations on the display screen.

Figure 13:
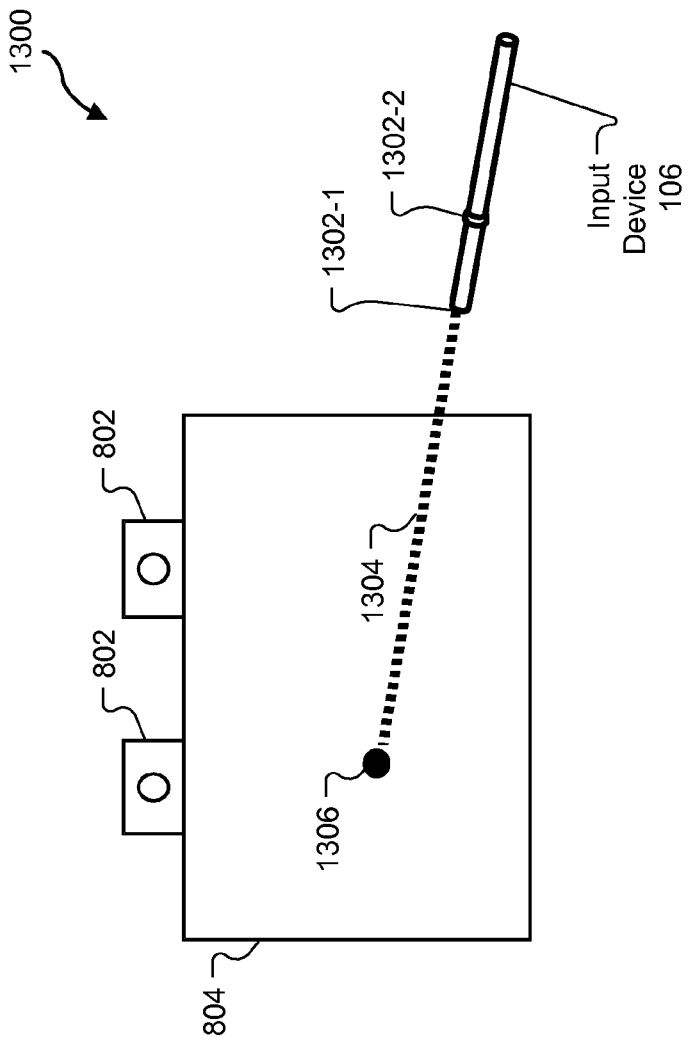
FIG. 13 illustrates an exemplary vector projection implementation of the system of FIG. 1 according to principles described herein.

Any spatial input having multiple three-dimensional multiple reference points that may be detected and used to compute a vector may be used for vector-based cursor projection. For example, FIG. 13 illustrates an exemplary vector-projection-based implementation 1300 of system 100 in which multiple sensing devices 802 positioned relative to display screen 804 may be configured to sense spatial input. Based on the spatial input, cursor projection facility 606 may identify locations of predefined reference points 1302 (e.g., reference points 1302-1 and 1302-2) within a physical user space and use the locations of the reference points 1302 to determine a vector 1304. As shown in FIG. 13, vector 1304 may project from reference point 1302-1 along a line formed by reference points 1302-1 and 1302-2 and toward display screen 804 such that vector 1304 intersects display screen 804 at cursor position 1306. Cursor projection facility 606 may map vector 1304 to cursor position 1306 on display screen 804 by computing a point at which vector 1304 intersects display screen 804 and setting the intersection point as cursor position 1306. In certain implementations, cursor projection facility 606 may user a vector projection heuristic to map reference points within a physical user space to a cursor position on a display screen in any of the ways described in the above-mentioned co-pending U.S. patent application Ser. No. 12/771,446 filed on Apr. 30, 2010.

In certain implementations, the reference points within the physical user space may correspond with positions of pointing signal source 308 and reference signal source 312 of input device 106. Pointing signal source 308 and reference signal source 312 may be disposed so as to form a linear pair of reference points that for a line corresponding to a direction in which elongate input device 106 is pointing. Accordingly, when a user points input device 106 at display screen 804, spatial input subsystem 104 may sense spatial data and, from the signals emitted by pointing signal source 308 and reference signal source 312 of input device 106, determine positions of pointing signal source 308 and reference signal source 312 within the physical user space. Spatial input subsystem 104 may process the positions of pointing signal source 308 and reference signal source 312 in accordance with a vector projection heuristic to determine a corresponding cursor position on display screen 804.

Spatial input subsystem 104 may be configured to provide one or more tools configured to facilitate user calibration of a vector projection heuristic during execution of a calibration mode. The tool(s) may be provided and/or the calibration mode executed in response to any predefined event, as described above. Accordingly, the user may provide input to configure the vector projection heuristic in a way that accounts for user preferences, abilities, and/or location.

The calibration tool may be presented during execution of the calibration mode and in any form suitable for use by the user to calibrate or re-calibrate a vector projection heuristic. For example, spatial input subsystem 104 may present one or more calibration prompts configured to guide the user through a calibration dialog with spatial input subsystem 104. Such prompts may be audible and/or visual instructions configured to direct the user to utilize input device 106 to perform one or more actions that may be used by spatial input subsystem 104 to calibrate the vector projection heuristic. In some examples, the visual instructions may be presented on display screen 804.

As an example, an exemplary calibration tool may be configured to direct a user to point input device 106 at display screen 804, such as is shown in FIG. 13. During execution of the calibration mode, spatial input subsystem 104 may use the spatial input provided by the user to detect, identify, and use multiple reference points to determine and map multiple vectors to display screen 804. Multiple cursors associated with the positions at which the vectors intersect display screen 804 may be concurrently displayed on the display screen 804. With the cursors displayed, spatial input subsystem 104 may provide the user with an option for selecting one of the cursors. The user may provide input indicating which of the cursors feels most comfortable and/or natural to the user. Spatial input subsystem 104 may receive the user input and calibrate the vector projection heuristic accordingly.

In certain embodiments, spatial input subsystem 104 may be configured to selectively operate in accordance with either a plane projection heuristic or a vector projection heuristic. To this end, spatial input subsystem 104 may be configured to provide a user with one or more tools that allow the user to select the heuristic to be used for cursor projection. Accordingly, the user may select whether a plane or vector projection heuristic will be used for cursor projection. Operation of spatial input subsystem 104 based on a plane projection heuristic may be referred to as operation in a "plane projection mode," and operation of spatial input subsystem 104 based on a vector projection heuristic may be referred to as operation in a "vector projection mode." In some examples, spatial input subsystem 104 may be configured to toggle between operating in plane and vector projection modes (e.g., dynamically on-the-fly during an active cursor projection session or when no cursor projection session is active) in response to user input selecting a projection heuristic.

As mentioned, spatial input subsystem 104 may be configured to concurrently detect and process spatial data provided by multiple input devices such as input device 106. Specific input devices may be associated with specific users such that multiple input devices may be utilized by multiple users to concurrently control a display. To this end, each input device may be distinguishable by spatial input subsystem 104. For example, each input device may emit one or more signals having one or more distinct attributes, such as, but not limited to, a distinctive strobe pattern, frequency, brightness, intensity, and/or color. Additionally or alternatively, each input device may include a distinctive visual marker that may be detected by spatial input subsystem 104. Additionally or alternatively, spatial input subsystem 104 may be configured to detect a specific action performed by a user utilizing an input device (e.g., causing the input device to emit a pattern of selection input commands) at session initiation, associate the input device with the user, and track the input device throughout the session. As such, spatial input subsystem 104 may track the identities of multiple simultaneous users (e.g., where the number of users "n" is greater than one) by tracking the movements and/or operations of multiple input devices 106 (e.g., n input devices 106) utilized by the multiple users, and project multiple cursors (e.g., n cursors) corresponding to the multiple input devices 106 accordingly.

Input device 106 allows a user utilizing input device 106 to provide spatial input for pointing and selection commands associated with a display screen. Accordingly, the user may utilize input device 106 to control a cursor position on a display screen and to select an object displayed on the display screen. These input capabilities may be leveraged to support higher-level interactions between a user and display subsystem 102. For example, interactions among multiple users utilizing multiple input devices on a shared display screen may be supported in any of the ways described in co-pending U.S. patent application Ser. No. 12/703,892, entitled "SYSTEMS AND METHODS FOR PROVIDING A SPATIAL-INPUT-BASED MULTI-USER SHARED DISPLAY EXPERIENCE," filed Feb. 11, 2010, and incorporated herein by reference in its entirety.

Figure 14:
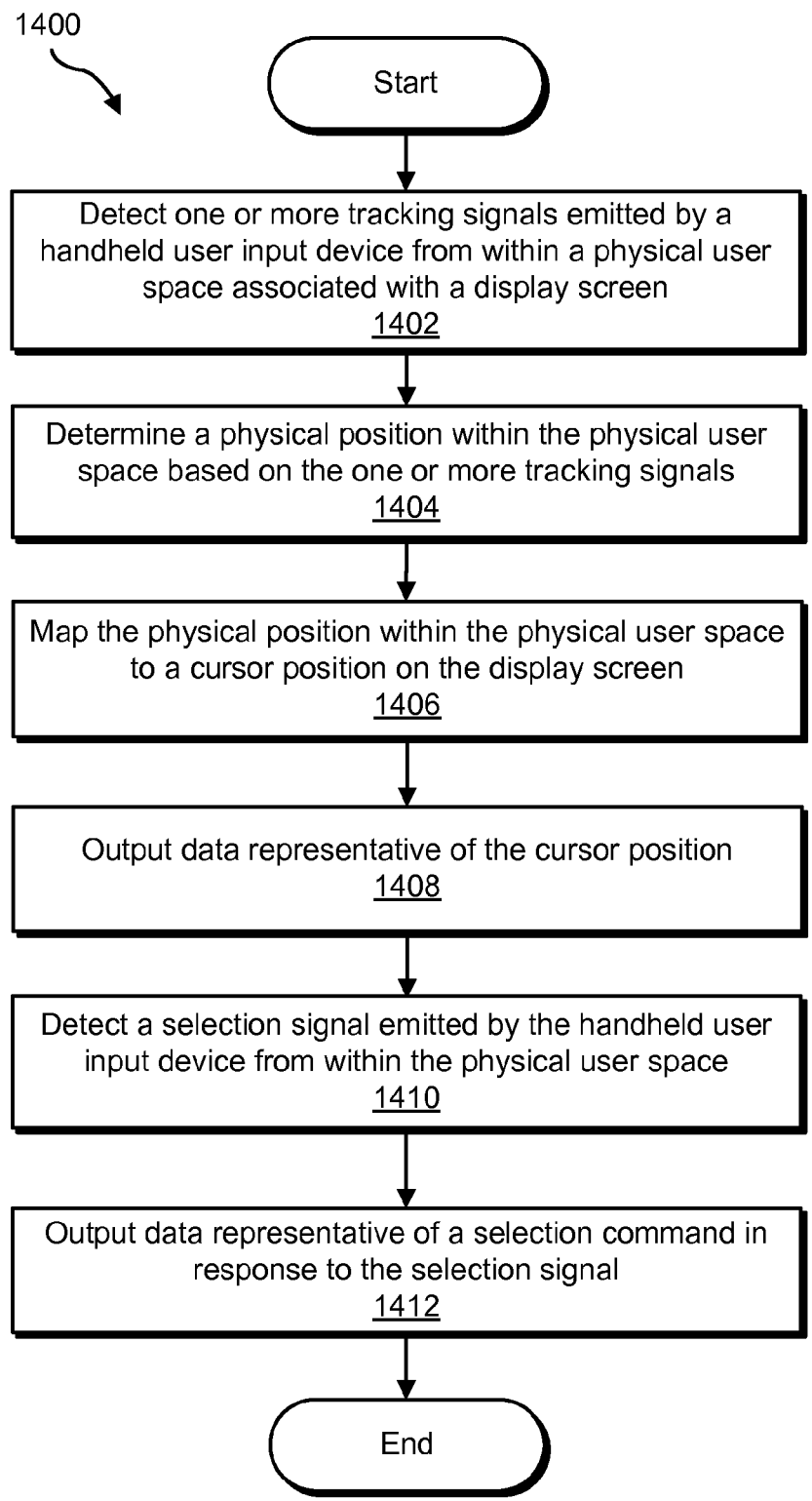
FIG. 14 illustrates an exemplary spatial input method according to principles described herein.

FIG. 14 illustrates an exemplary spatial input method 1400. While FIG. 14 illustrates exemplary steps according to one embodiment, other embodiments may omit, add to, reorder, combine, and/or modify any of the steps shown in FIG. 14. In certain embodiments, one or more of the steps shown in FIG. 14 may be performed by spatial input subsystem 104.

In step 1402, one or more tracking signals emitted by a handheld user input device from within a physical user space associated with a display screen may be detected. For example, spatial input subsystem 104 may detect a pointing signal emitted by input device 106 from within a physical user space and directed at a display screen, as described above. In certain implementations, step 1402 may also include spatial input subsystem 104 detecting a reference signal emitted by input device 106 from within the physical user space, as described above.

In step 1404, a physical position within the physical user space may be determined based on the one or more tracking signals detected in step 1402. Spatial input subsystem 104 may determine the physical position within the physical user space based on the one or more tracking signals in any of the ways described herein. In certain implementations, step 1404 may also include spatial input subsystem 104 determining an additional physical position within the physical user space associated with a source of a reference signal emitted by input device 106, as described above.

In step 1406, the physical position within the physical user space may be mapped to a cursor position on the display screen. Spatial input subsystem 104 may map the physical position within the physical user space to a cursor position on the display screen in any of the ways described herein, including in accordance with at least one of a plane projection heuristic and a vector projection heuristic.

In step 1408, data representative of the cursor position determined in step 1406 may be output. For example, spatial input subsystem 104 may output data representative of the cursor position to display subsystem 102, as described above.

In step 1410, a selection signal emitted by the handheld user input device from within the physical user space may be detected. For example, spatial input subsystem 104 may detect a selection signal emitted by input device 106 in any of the ways described above.

In step 1412, data representative of a selection command may be output in response to the selection signal detected in step 1410. For example, spatial input subsystem 104 may output data representative of the selection command to display subsystem 102, as described above.

Although not shown in FIG. 14, one or more steps of method 1400 may be repeated, such as by implementing one or more processing loops including one or more steps of method 1400. For example, after step 1408 or 1412 is performed, processing may return to step 1402 when one or more additional tracking signals are detected. As another example, after step 1412 is performed, processing may return to step 1410 when an additional selection signal is detected. In other examples, processing may move from any other step in method 1400 to step 1402 when one or more tracking signals are detected or to step 1410 when a selection signal is detected. In certain implementations, one or more steps of method 1400 may be performed concurrently or in parallel. For example, any of the steps related to tracking signals (e.g., steps 1402-1408) and any of the steps related to a selection signal (e.g., steps 1410-1412) may be performed concurrently or in parallel to handle concurrently or overlapping detected signals emitted by the handheld user input device.

Figure 15:
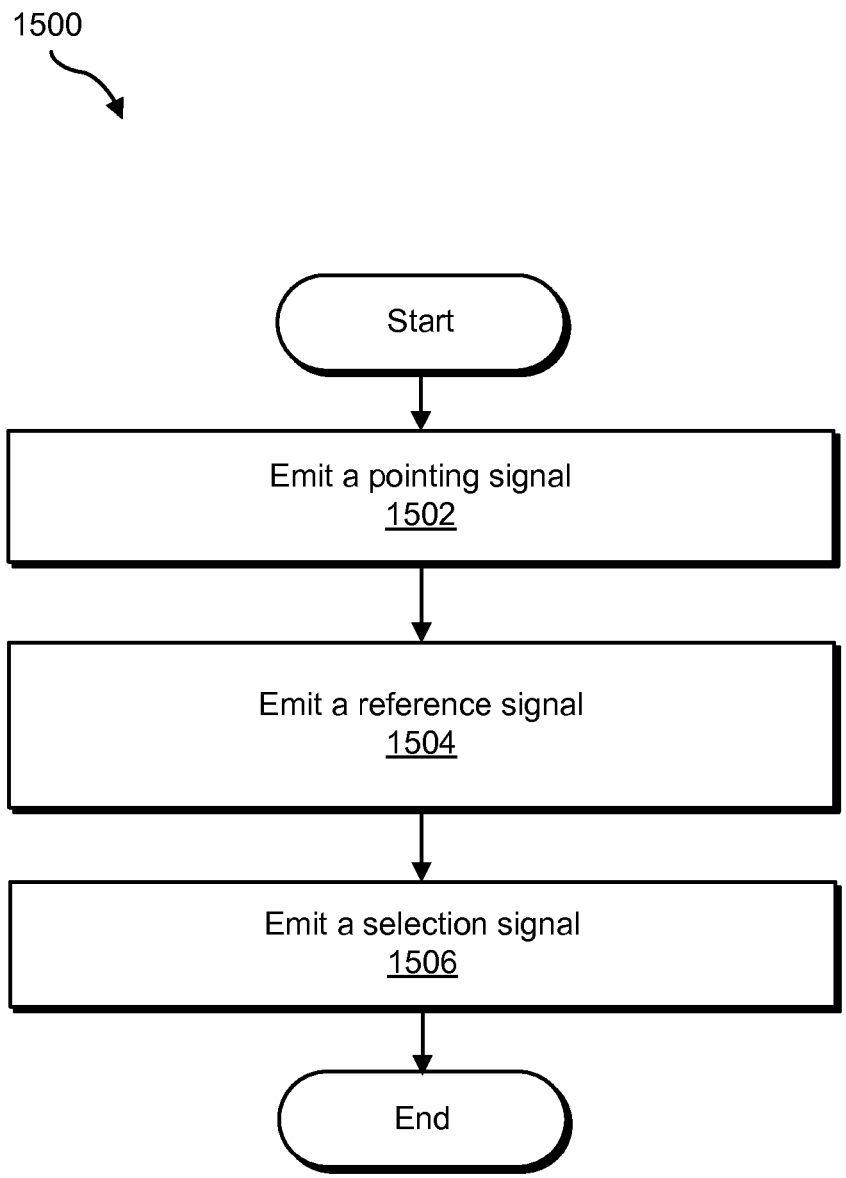
FIG. 15 illustrates an exemplary spatial input method according to principles described herein.

FIG. 15 illustrates an exemplary spatial-input-based cursor projection method 1500. While FIG. 15 illustrates exemplary steps according to one embodiment, other embodiments may omit, add to, reorder, combine, and/or modify any of the steps shown in FIG. 15. In certain embodiments, one or more of the steps shown in FIG. 15 may be performed by input device 106.

In step 1502, a pointing signal may be emitted. For example, input device 106 may emit a pointing signal, as described above. In certain implementations, input device 106 may emit the pointing signal in response to a detection of movement of input device 106, as described above. As also described above, input device 106 may be configured to terminate the emission of the pointing signal in response to a detected lack of movement of input device 106 for a predetermined period of time.

In step 1504, a reference signal may be emitted. For example, input device 106 may emit a reference signal for detection and use by spatial input subsystem 104 in applying a vector projection heuristic, as described above.

In step 1506, a selection signal may be emitted. For example, input device 106 may emit a selection signal for detection by spatial input subsystem 104, as described above.

While certain examples described above are directed to a handheld user input device, the user input device may be otherwise utilized and/or controlled by a user. For example, the user input device may be wearable or otherwise attachable to a user. For instance, the user input device may be mounted on a ring, watch, pair of glasses (e.g., 3D viewing glasses), headband, article of clothing, accessory, or other item that is wearable by a user.

Furthermore, while certain examples described above are directed to mapping a physical location within a three-dimensional sensing space to a cursor position within a two-dimensional display (e.g., a display presented on a two-dimensional display surface), the examples are illustrative only. In other examples, a physical location within a three-dimensional sensing space may be mapped (e.g., by cursor projection) to a cursor position with a three-dimensional display. For example, certain gestures, movements, buttons, signals associated with input device 106 may be defined to indicate that the cursor is to be moved or otherwise positioned along a z-axis dimension ("Z dimension") that is perpendicular to the plane of the display screen.

An effect of the cursor being positioned along the Z dimension in a three-dimensional display may be generated in any suitable way. For example, when a display is presented using a two-dimensional display, graphical effects may be used to create an illusion of cursor movement and/or positioning in the Z dimension. Such graphical effects may include, without limitation, movement of other graphical objects (e.g., graphical objects surrounding the cursor position) in the display (e.g., when the user perspective view is "attached" to the cursor position), changing the size, brightness, visible detail, and/or other attribute of the cursor (e.g., when the user perspective view is fixed in the Z dimension the cursor may be rendered as smaller in size and dimmer in brightness as the cursor position moves away from the user), employing a rectilinear reference grid or other graphical objects to convey depth perspective, and any other graphical effect configured to convey depth perspective on a two-dimensional display.

As another example, when a display is presented using three-dimensional display technologies such as active shutter glasses, polarized lens glasses, and/or other three-dimensional display technologies, a three-dimensional position (e.g., a position defined by (x, y, z) coordinates) within a three-dimensional sensing space may be mapped to a cursor position (e.g., a position defined by (x, y, z) coordinates) within a three-dimensional space associated with the three-dimensional display, perhaps with a scaling factor appropriate for a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a handheld user input device including a power source that provides power for the handheld user input device to
        emit a pointing signal from within a physical user space and directed at a display screen, the pointing signal having a first signal attribute, and
        emit a selection signal from within the physical user space and directed at the display screen, the selection signal including a strobe having a second signal attribute distinguishing the selection signal from the pointing signal; and
    a spatial input subsystem configured to
        detect the pointing signal,
        determine a physical position within the physical user space based on the detected pointing signal,
        map the determined physical position within the physical user space to a cursor position on the display screen,
        output data representative of the cursor position for use by a display subsystem associated with the display screen, detect the selection signal, and
output, in response to the selection signal, data representative of a selection command for use by the display subsystem.

2. The system of claim 1, wherein the pointing signal comprises one of a discrete infrared signal and a discrete visible light signal and the selection signal comprises the other one of the discrete infrared signal and the discrete visible light signal.

3. The system of claim 1, wherein the physical user space comprises a three-dimensional user space located in front of the display screen.

4. The system of claim 1, wherein:
the spatial input subsystem comprises one or more cameras; and
the physical user space coincides with a field of view of the one or more cameras.

5. The system of claim 1, wherein:
the handheld user input device comprises an outer housing configured to be held by a user; and
the handheld user input device is configured to emit the selection signal from within the physical user space when a segment of the outer housing of the handheld user input device is compressed by the user to cause a switch to complete a selection circuit within the handheld user input device.

6. The system of claim 1, wherein the spatial input subsystem is configured to map the determined physical position within the physical user space to the cursor position on the display screen based on one of a plane projection heuristic and a vector projection heuristic.

7. The system of claim 1, wherein:
the handheld user input device is further configured to emit a reference signal from within the physical user space; and
the spatial input subsystem is further configured to
detect the reference signal,
determine an additional physical position within the physical user space based on the detected reference signal, and
utilize the physical position and the additional physical position within the physical user space to map the physical position to the cursor position on the display screen.

8. The system of claim 7, wherein the spatial input subsystem is configured to utilize the physical position and the additional physical position to map the physical position to the cursor position by
determining a vector based on the physical position and the additional physical position;
determining an intersection of the vector with the display screen; and
setting the intersection as the cursor position.

9. The system of claim 1, wherein the handheld user input device is further configured to
detect movement of the handheld user input device,
begin emitting the pointing signal in response to the detected movement, and
continue to emit the pointing signal until movement of the handheld user input device is not detected for a predetermined time period.

10. The system of claim 1, wherein the handheld user input device comprises:
an elongate housing configured to be held by a user;
a discrete pointing signal source integrated at an end of the elongate housing and configured to emit the pointing signal; and
a discrete selection signal source integrated at the same end of the elongate housing and configured to emit the selection signal.

11. The system of claim 10, wherein the handheld user input device further comprises:
a first switch configured to selectively connect the power source to the pointing signal source to cause the pointing signal source to emit the pointing signal; and
a second switch configured to selectively connect the power source to the selection signal source to cause the selection signal source to emit the selection signal.

12. The system of claim 10, wherein the handheld user input device further comprises a reference signal source protruding from and encircling the elongate housing at a position along the elongate housing that is distant of the end of the elongate housing, the reference signal source configured to emit a reference signal.

13. The system of claim 12, wherein the handheld user input device further comprises:
a switch configured to selectively connect the power source to the pointing signal source to cause the pointing signal source to emit the pointing signal and to the reference signal source to cause the reference signal source to emit the reference signal.

14. The system of claim 1, wherein the spatial input subsystem is further configured to
associate the cursor position with an object displayed on the display screen; and
select, in response to the data representative of the selection command being output, the object displayed on the display screen.

15. A system comprising:
at least one sensor configured to capture data representative of a physical user space that is remote from the at least one sensor, the data representative of the physical user space including data representative of a pointing signal and a selection signal emitted by a handheld user input device from within the physical user space, wherein
the handheld user input device includes a power source that provides power for the handheld user input device to emit the pointing signal and the selection signal,
the pointing signal has a first signal attribute, and
the selection signal includes a strobe having a second signal attribute distinguishing the selection signal from the pointing signal; and
a computing device communicatively coupled to the at least one sensor, the computing device configured to
provide display content for presentation on a display screen,
receive data representative of the physical user space from the at least one sensor,
analyze the data representative of the physical user space to detect the pointing signal and the selection signal,
determine a physical position within the physical user space based on the pointing signal,
map the physical position within the physical user space to a cursor position on the display screen, and
execute one or more operations associated with the display content based on the cursor position and the selection signal.

16. A method comprising:
detecting, by a spatial input subsystem, a pointing signal having a first signal attribute and emitted by a handheld user input device from within a physical user space and directed at a display screen, the handheld user input device including a power source that provides power for the handheld user input device to emit the pointing signal;

determining, by the spatial input subsystem, a physical position within the physical user space based on the detected pointing signal;

mapping, by the spatial input subsystem, the determined physical position within the physical user space to a cursor position on the display screen;

outputting, by the spatial input subsystem, data representative of the cursor position for use by a display subsystem associated with the display screen;

detecting, by the spatial input subsystem, a selection signal including a strobe having a second signal attribute distinguishing the selection signal from the pointing signal and emitted by the handheld user input device from within the physical user space and directed at the display screen, the power source included in the handheld user input device providing power for the handheld user input device to emit the selection signal; and outputting, by the spatial input subsystem in response to the selection signal, data representative of a selection command for use by the display subsystem.

17. The method of claim 16, wherein:
the detecting of the pointing signal comprises one or more cameras of the spatial input subsystem detecting the pointing signal; and
the detecting of the selection signal comprises the one or more cameras of the spatial input subsystem detecting the selection signal.

18. The method of claim 16, wherein the pointing signal comprises one of a discrete infrared signal and a discrete visible light signal and the selection signal comprises the other one of the discrete infrared signal and the discrete visible light signal.

19. The method of claim 16, wherein the mapping of the determined physical position within the physical user space to the cursor position on the display screen is based on one of a plane projection heuristic and a vector projection heuristic.

20. The method of claim 16, further comprising:
detecting, by the spatial input subsystem, a reference signal emitted by the handheld user input device from within the physical user space; and
determining, by the spatial input subsystem, an additional physical position within the physical user space based on the detected reference signal;
wherein the mapping of the determined physical position within the physical user space to the cursor position on the display screen includes utilizing the physical position and the additional physical position within the physical user space to map the physical position to the cursor position on the display screen.

21. The method of claim 20, wherein the utilizing of the physical position and the additional physical position to map the physical position to the cursor position on the display screen includes:
determining a vector based on the physical position and the additional physical position;
determining an intersection of the vector with the display screen; and
setting the intersection as the cursor position.

22. The method of claim 16, further comprising:
detecting, by the handheld user input device, movement of the handheld user input device; and
emitting, by the handheld user input device, the pointing signal in response to the movement of the handheld user input device.

23. The method of claim 22, further comprising:
detecting, by the handheld user input device, a lack of movement of the handheld user input device for a predetermined period of time; and
terminating, by the handheld user input device, the emitting of the pointing signal in response to the lack of movement of the handheld user input device for the predetermined period of time.

24. The method of claim 16, further comprising:
emitting, by the handheld user input device, the selection signal in response to a compression of a flexible segment of an outer housing of the handheld user input device; and
terminating, by the handheld user input device, the emitting of the selection signal in response to a release of the compression of the flexible segment of the outer housing of the handheld user input device.

25. The method of claim 16, embodied as computer-executable instructions on at least one non-transitory computer-readable medium.

26. An apparatus comprising:
a elongate housing configured to be held by a user;
a pointing signal source disposed at an end of the elongate housing and configured to generate and emit a pointing signal having a first signal attribute from a physical user space and directed at a display screen, the pointing signal configured for detection by a spatial input subsystem associated with the display screen;
a selection signal source disposed at the end of the elongate housing and configured to generate and emit a selection signal including a strobe having a second signal attribute distinguishing the selection signal from the pointing signal from the physical user space and directed at the display screen, the selection signal configured for detection by the spatial input subsystem associated with the display screen;
a power source disposed within the elongate housing and configured to provide power to at least the pointing signal source and the selection signal source;
a motion sensor disposed within the elongate housing and configured to sense movement of the apparatus;
a first switch disposed within the elongate housing and configured to
selectively connect the power source to the pointing signal source to cause the pointing signal source to emit the pointing signal in response to the motion sensor sensing movement of the apparatus, and
selectively disconnect the power source from the pointing signal source to cause the pointing signal source to stop emitting the pointing signal in response to the motion sensor not sensing movement of the apparatus for a predetermined period of time; and
a second switch within the elongate housing and configured to
selectively connect the power source to the selection signal source to cause the selection signal source to emit the selection signal in response to a compression of a flexible segment of the elongate housing, and
selectively disconnect the power source from the selection signal source to cause the selection signal source to stop emitting the selection signal in response to a release of the compression of the flexible segment of the elongate housing.

27. The apparatus of claim 26, further comprising a reference signal source disposed along an outer surface of the elongate housing at a position that is distant the end of the elongate housing, the reference signal source configured to emit a reference signal;
  wherein the first switch is further configured to
    selectively connect the power source to the reference signal source to cause the reference signal source to emit the reference signal in response to the motion sensor sensing movement of the apparatus, and
    selectively disconnect the power source from the reference signal source to cause the reference signal source to stop emitting the reference signal in response to the motion sensor not sensing movement of the apparatus for the predetermined period of time.

\* \* \* \* \*